(12) United States Patent
Stokes et al.

(10) Patent No.: US 6,583,629 B1
(45) Date of Patent: Jun. 24, 2003

(54) MAGNETIC DIGITAL SIGNAL COUPLER MONITOR

(75) Inventors: John F. Stokes, Rochester, MN (US); Erik H. Lange, Coon Rapids, MN (US); Alexander Templeton, Chanhassen, MN (US)

(73) Assignee: NVE Corporation, Eden Praire, MN (US)

(*) Notice: Subject to any disclaimer, the term of this patent is extended or adjusted under 35 U.S.C. 154(b) by 305 days.

(21) Appl. No.: 09/677,170

(22) Filed: Oct. 2, 2000

Related U.S. Application Data

(60) Provisional application No. 60/157,465, filed on Oct. 1, 1999, and provisional application No. 60/200,131, filed on Apr. 27, 2000.

(51) Int. Cl.[7] .............................................. G01R 27/26
(52) U.S. Cl. ..................................................... 324/632
(58) Field of Search ......................... 324/117 R, 117 H, 324/158.1, 606, 609, 529, 530, 687, 632, 450, 133, 252

(56) References Cited

U.S. PATENT DOCUMENTS

| | | | |
|---|---|---|---|
| 4,385,273 A | 5/1983 | Lienhard et al. | 324/117 R |
| 4,754,219 A | 6/1988 | Milkovic | 324/142 |
| 5,528,136 A | 6/1996 | Rogoff et al. | 324/158.1 |
| 5,814,983 A | 9/1998 | Shum | 324/117 R |
| 5,952,849 A * | 9/1999 | Haigh | 326/82 |

FOREIGN PATENT DOCUMENTS

| WO | WO 99/21332 | 10/1998 | H04L/25/02 |
|---|---|---|---|

* cited by examiner

Primary Examiner—N. Le
Assistant Examiner—Vincent Q. Nguyen
(74) Attorney, Agent, or Firm—Kinney & Lange, P.A.

(57) ABSTRACT

A signal transmission system (10) for providing electrical energization to a load electrically connected to a system output (38) based on input signals provided to a system input (11,12). The system (10) has a condition determiner for determining the occurrence or absence of a selected condition. A pulser to provide the system output and the system input connected to an oscillator. The condition determiner is coupled to at least a selected one of the oscillator and the pulser to cause the pulser to provide electrical energization pulses at the system output based on the system input (11,12).

16 Claims, 5 Drawing Sheets

1

MAGNETIC DIGITAL SIGNAL COUPLER MONITOR

CROSS-REFERENCE TO RELATED APPLICATIONS

This application claims priority from Provisional Application No. 60/157,465, filed Oct. 1, 1999, entitled "Power Monitor for Isolator", and Provisional Application No. 60/200,131, filed Apr. 27, 2000, entitled "Logic Isolator".

This invention was made with United States government support under Cooperative Agreement No. 70NANB8H4063 awarded by NIST. The government has certain rights in this invention.

BACKGROUND OF THE INVENTION

The present invention relates to ferromagnetic thin-film structures exhibiting relatively large magnetoresistive characteristics that are used to couple digital signals from a source to an isolated receiver magnetically and, more particularly, to circuits used to monitor performance of such coupling structures.

Many kinds of electronic systems make use of magnetic devices including both digital systems, such as memories, and analog systems such as field sensors. Magnetometers and other magnetic field sensing devices are used extensively in many kinds of systems including magnetic disc memories and magnetic tape storage systems of various kinds. Such devices provide output signals representing the magnetic field sensed thereby in a variety of situations.

One use for such magnetic field sensors is the sensing of magnetic fields generated by electrical currents in a conductor as a basis for inferring the nature of such currents giving rise to these fields. While this has long been done for magnetic fields generated by substantial currents, such sensing becomes more difficult to accomplish in smaller ranges of currents that include relatively small currents. The need for sensing fields due to such currents arises, for instance, in situations where the currents generating the field to be measured are provided merely as a basis for conveying signal information rather than for transmitting substantial electrical energy.

Such a situation occurs in many medical systems, instrumentation systems and control systems where there is often a need to communicate signals to system portions over signal interconnections from an external source or from another portion of the system. Often, the conductors carrying signal currents for such purposes must be electrically isolated from the portion of the system containing the sensor arrangement for those signals to measure the resulting magnetic field. As an example, a long current loop carrying signal information in the loop current may, through lightning or static electricity discharges, become subject to having large voltage potentials relative to ground developed thereon. Such potentials must in many instances be kept from the signal sensing and receiving circuitry to avoid damage thereto even though that circuitry must still be able to capture the signal information contained in the loop current.

Signal isolators for these purposes are often preferably formed in monolithic integrated circuit chips for reasons of cost, convenience and system performance. In such an arrangement, one or more solid state magnetic field sensors are used to detect the magnetic fields provided by the currents containing the signals. One effective arrangement that has emerged in these circumstances for signal isolation in both hybrid integrated circuits and monolithic integrated circuits comprises an input conductor, typically in some coiled electrical current conductor configuration, and a current sensor both supported on a substrate adjacent to and spaced apart from the input conductor so that they are electrically isolated from one another but with the current sensor positioned in those magnetic fields arising from any input currents appearing in the input conductor. The sensor is often connected to an amplifier to form a current determiner. Such an isolator or determiner is an attractive device for these purposes in being both rapid in operation and economic low in cost, and has been disclosed in U.S. Pat. No. 5,831,426 to W. C. Black and T. M. Herrmann entitled "Magnetic Current Sensor", and in U.S. Pat. No. 6,300617 to J. M. Daughton, R. T. Fayfield, T. M. Hermann and J. F. Stokes entitled "Magnetic Digital Signal Coupler," both of which have been assigned to the same assignee as the present application and both of which are hereby incorporated herein by reference.

These current sensors are typically magnetoresistive effect based sensors. They are typically formed with an intermediate thin-film layer of a nonmagnetic separating material having two major surfaces on each of which an anisotropic ferromagnetic thin-film is positioned which has been found to lead to a "giant magnetoresistive effect" in the sensor if the thickness of the ferromagnetic thin-films in the intermediate layer in such a "sandwich" structure have been made sufficiently small, or to a magnetically controlled tunnel diode.

In such monolithic integrated circuit based signal isolators, power dissipation can be reduced along with the risks of electromigration of the conductors therein, and so the reliability thereof can be increased, by using a differentiating input driver circuit, or at least an input driver circuit that approximates differentiation, for operating the input coil rather than allowing the original current signal carrying the information to be transferred to circulate therethrough. Such a differentiating driver circuit, or differentiating-like driving circuit, generates either a set or reset pulse in the input coil whenever the digital input signal transitions between low and high logic state current levels, or vice versa, and so in the magnetic field generated thereby. The inherent memory characteristics of certain "giant magnetoresistive effect" based sensors, or the use of latching electronics in the receiver circuits connected to other kinds of "giant magnetoresistive effect" sensors (or even to such sensors with inherent memory characteristics), maintains the output of the signal isolation in its most recent logic state until the receiver circuit detects a change of logic state in the input signal, i.e. another set or reset pulse. High common mode rejection capabilities are typically designed into such signal isolators to ensure that the output responds only to such logic state changes in the input circuitry during normal operation.

However, under abnormal power supply performance conditions, or during circuit operation initiation after first switching on the digital isolator for a new use session, there exists the possibility of the signal isolator output to exhibit an incorrect logic state. An incorrect logic state can result in erroneous data, damaged equipment, or can be a safety hazard when the device is used in man-machine interface equipment. Also, since the signal isolator operates on the rising and falling edges of the input signal transistions between logic states, i.e. is an edge triggered device, it is susceptible to spurious edge triggers leading to the risk of the output data being erroneously shifted in logic states so that it no longer tracks the logic states of the input signal. Spurious edge triggerings of the isolator can be caused by ground transients, electromagnetic interference or unexpected transients through the power supply and the like. This risk is especially high in low data rate input signals or low rate of change between logic states in the input signal where the time between desired logic state transitions, or in completing a transition, becomes relatively long thereby increasing the time for such unwanted occurrences.

Such problems have been sought to be overcome by transmitting an updating signal, with respect to the current input logic state, to the receiver circuit across the isolation barrier between the input coil and the receiver sensor at a predefined rate. Alternatively, both input signals and timing ("clocking") signals have been transmitted across the isolation barrier as a basis for determining occurrences of desired logic state changes. Such arrangements, however, lead to increased power dissipation and increase complexity of the circuitry both on the input coil side of the isolation barrier and on the receiver side of that barrier. Thus, there is a desire to provide an arrangement that monitors the logic state situation on the input coil side of the isolation barrier and to provide some assurance as to the correct logic state on the receiver side of the isolation barrier with respect to the current or last logic state of the input signal on the input coil side of that barrier.

BRIEF SUMMARY OF THE INVENTION

The present invention provides a transformable signal transmission system for providing electrical energization to a load electrically connected to a system output based on input signals provided to a system input except during occurrences of a selected condition which occurrences initiate a transmission transformation during which an alternative energization is provided to the load. The system has a condition determiner for determining the occurrence or absence of the selected condition and provides a first condition signal upon absences of the selected condition and a second condition signal upon occurrences of said selected condition. A pulser provides the system output and the system input and is also connected to an oscillator. The condition determiner control output is coupled to at least a selected one of the oscillator and the pulser. This pulser is capable of providing electrical energization pulses at the system output based on the system input signals when the first condition signal is provided on the condition determiner control output, and of providing alternative electrical energization at the system output based on signals supplied by the oscillator when the second condition signal is provided on said condition determiner control output.

The system output can be connected to a coil to provide pulsed magnetic fields about a magnetic field sensor positioned on the other side of an electrical insulating layer from that coil. The selected conditions include magnitudes of operating voltage supplied to the signal transmission system being less than a selected monitoring value and durations of times between occurrences of pulses at the pulser output exceeding a corresponding selected monitoring value.

DETAILED DESCRIPTION

Figure 1A:
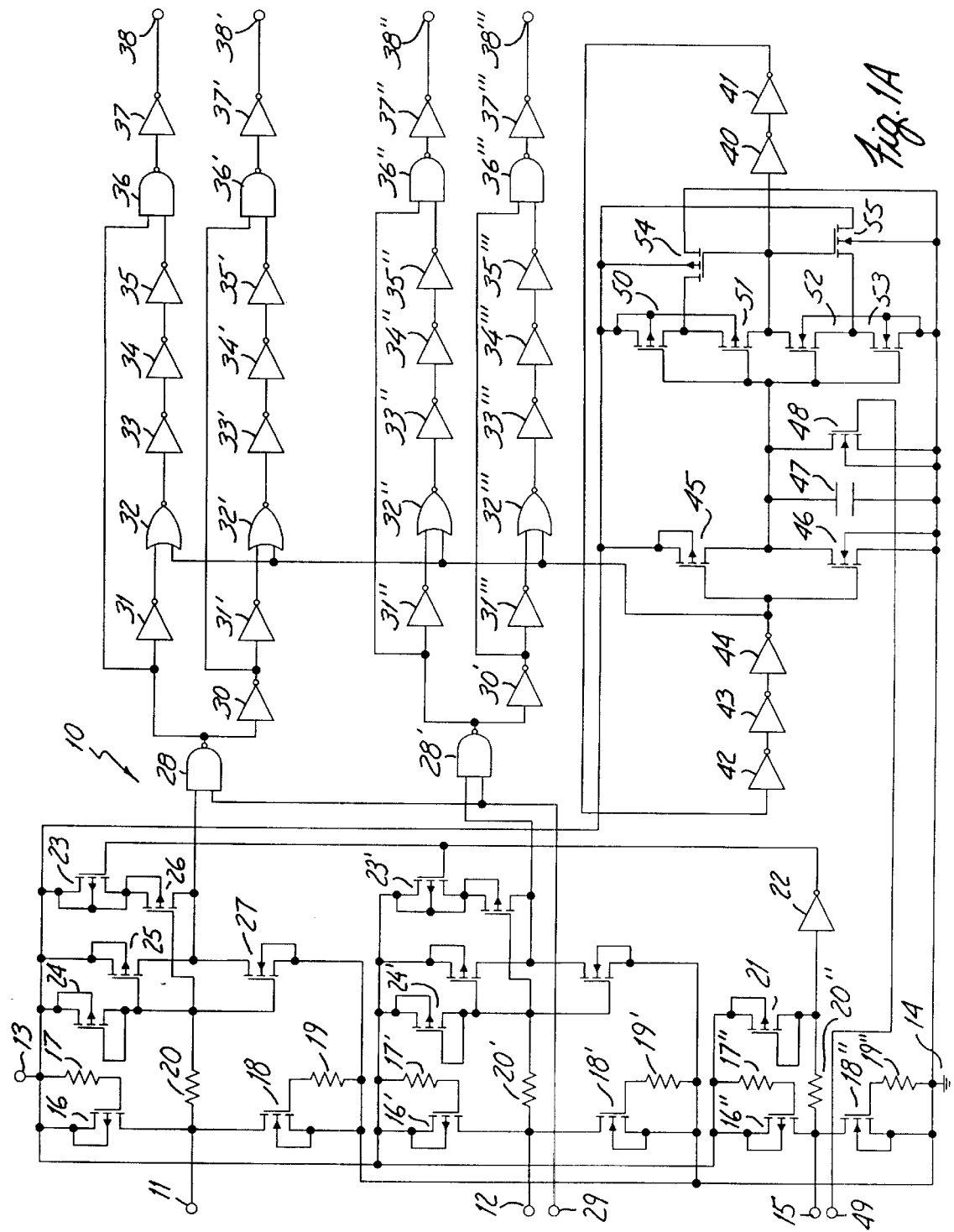
FIG. 1 shows a mixed circuit and logic schematic diagram of a signal isolator input arrangement embodying a portion of the present invention.
Figure 1B:
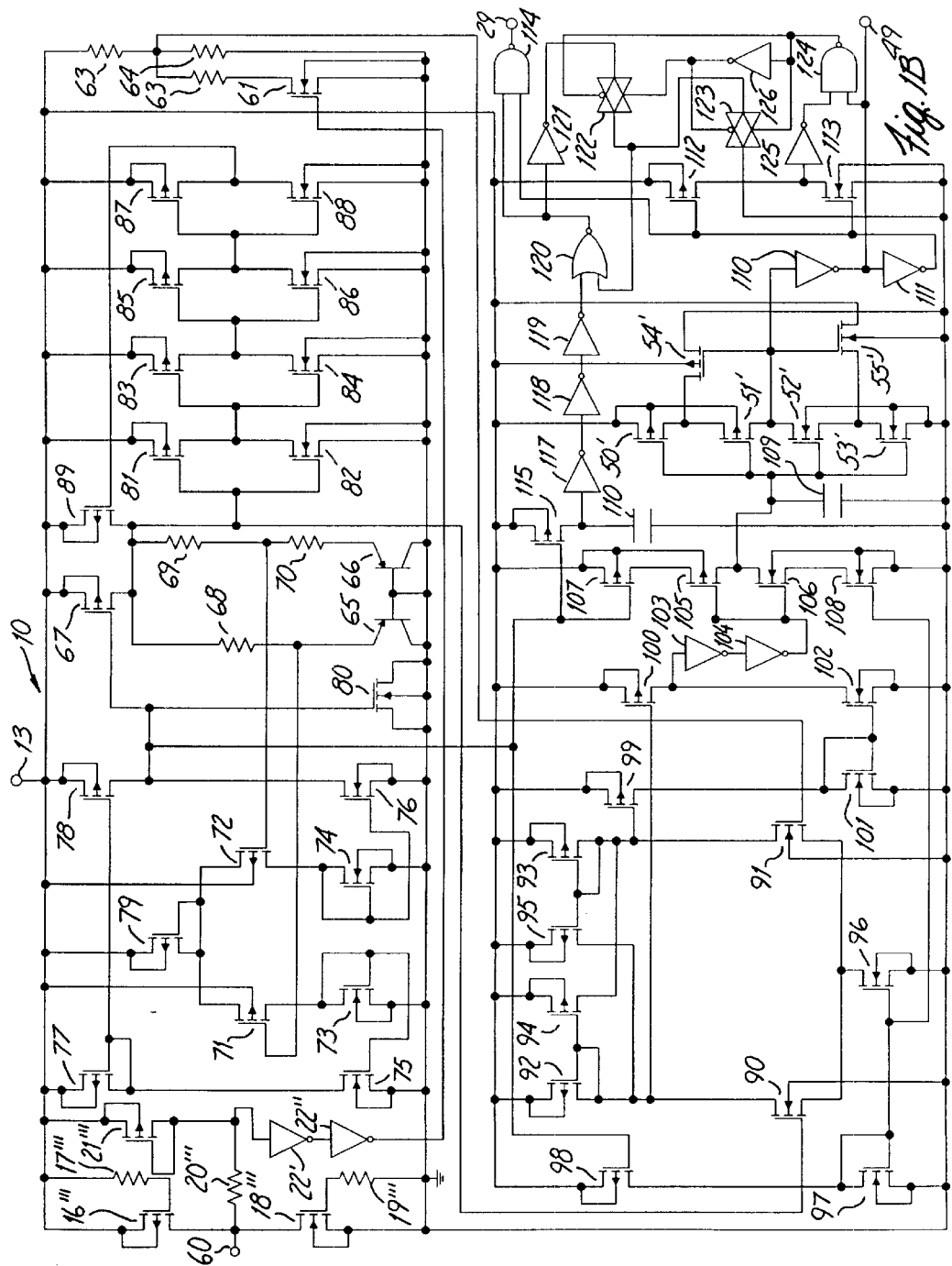

FIGS. 1A and 1B provide mixed circuit and logic gate schematic diagrams that together show a conditional signal isolator input arrangement, 10, for operating a pair of input coils forming two separate signal transmission information channels each being operated from a different input signal source. Of course, the circuit could be used to operate a single input coil to provide a single information transmission channel if desired. Such input signal sources, not shown, are connected in the first instance, to an input signal terminal, 11, and, in the second instance, to an input signal terminal, 12.

Signal isolator input circuit 10 is formed using complementary-metal-oxide-semiconductor field-effect transistor (CMOS) circuit technology as shown in FIGS. 1A and 1B to be formed in a monolithic integrated circuit chip, although this is not necessary as other circuit technologies could be used in forming such chips. This circuitry is operated between a pair of voltage supply terminals, 13 and 14, suited to have a voltage supply with a positive voltage output of typically either 3.0 or 5.0 Volts value electrically connected to terminal 13 and a voltage ground reference electrically connected to terminal 14. In recognition that the input signal sources could also be fabricated alternatively in different circuit technologies, a further input, 15, is provided for selecting whether driver circuit 10 is to operate with input logic state voltage levels typical of CMOS based circuitry, or with input logic state voltage levels typical of bipolar transistor based circuitry.

Each of these inputs, inputs 11 and 12 to receive input signal from corresponding signal sources, and input 15 to receive a control signal for selecting the signal source circuitry type input operating levels at inputs 11 and 12, have electrostatic discharge circuitry protection provided immediately following them. Thus, a p-channel MOSFET, 16, is connected at one of its channel terminating regions (i.e., sources and drains) to signal input terminal 11 with its other terminating region connected to voltage supply terminal 13 as is its gate through a transient current limiting resistor, 17. Another p-channel MOSFET, 16', is connected at one of its channel terminating regions to signal input terminal 12 with its other terminating region connected to voltage supply terminal 13 as is its gate through a transient current limiting resistor, 17'. Finally, a p-channel MOSFET, 16", is connected at one of its channel terminating regions to control input terminal 15 with its other terminating region connected to voltage supply terminal 13 as is its gate through a transient current limiting resistor, 17". These transistors limit positive voltage excursions on that input or control terminal to which each is connected to being within one transistor threshold voltage value of the voltage on terminal 13.

Similarly, a n-channel MOSFET, 18, is connected at one of its channel terminating regions to signal input terminal 11 with its other terminating region connected to ground reference terminal 14 as is its gate through a transient current limiting resistor, 19. Another n-channel MOSFET, 18', is connected at one of its channel terminating regions to signal input terminal 12 with its other terminating region connected to ground reference terminal 14 as is its gate through a transient current limiting resistor, 19'. Finally, a n-channel MOSFET, 18", is connected at one of its channel terminating regions to control input terminal 15 with its other terminating region connected to ground terminal 14 as is its gate through a transient current limiting resistor, 19". These transistors limit negative voltage excursions on that input or control terminal to which each is connected to being within one transistor threshold voltage value of the voltage on terminal 14.

A further current limiting resistor, 20, is connected between signal input terminal 11 and subsequent input signal switching point shift controlled circuitry to limit currents to that circuitry due to large input signal excursions through forcing such currents instead primarily into protective transistors 16 or 18. Again, another current limiting resistor, 20', is connected between signal input terminal 12 and subsequent input signal switching point shift controlled circuitry to limit currents to that circuitry due to large input signal excursions through forcing such currents instead primarily into protective transistors 16' or 18'. Finally, a current limiting resistor, 20", is connected between control input terminal 15 and subsequent input signal switching point shift control circuitry to limit currents to that circuitry due to large input signal excursions through forcing such currents instead primarily into protective transistors 16" or 18".

The input signal switching point shift controlled circuitry connected to resistor 20 and that connected to resistor 20' are each controlled by the input signal switching point shift control circuitry connected to resistor 20". The latter has a diode-connected p-channel MOSFET, 21, connected between positive voltage supply terminal 13 and the junction of resistor 20" and the input of a conventional CMOS inverter, 22, providing a logic state inversion and an input control signal buffer. MOSFET 21 has a width-to-length ratio giving it a large effective resistance value. Thus, MOSFET 21 holds the input of inverter 22 at a voltage value near that on terminal 13 if control input 15 is left open. However, placing terminal 15 at a voltage near ground will put the input of inverter 22 at a similar low voltage since the resistance value of resistor 20" will be small compared to the effective resistance value of MOSFET 21. Thus, logic high and low values on control terminal 15 reaching the input of inverter 22 will provide the opposite logic values at the output of that inverter to control the input signal switching point shift controlled circuitry connected to resistor 20, and that connected to resistor 20'. This is done through inverter 22 as a buffer providing a capability for switching on or off a pair of p-channel MOSFETs, 23 and 23', through the gates thereof to which the output of this inverter is connected, each of these MOSFETs being in a corresponding one of those controlled circuits.

A diode-connected p-channel MOSFET, 24, in the input signal switching point shift controlled circuitry connected to resistor 20 in which MOSFET 24 is connected between that resistor and terminal 13, and a diode-connected p-channel MOSFET, 24', in the input signal switching point shift controlled circuitry connected to resistor 20' in which MOSFET 24' is connected between that resistor and terminal 13, each operate as does MOSFET 21. This allows input signals on input signal terminal 11 through resistor 20 to switch the output logic state of an inverter having a pair of p-channel MOSFETs, 25 and 26, connected in parallel with one another together in series with a n-channel MOSFET, 27. Resistor 20 is connected between terminal 11 and the input of that inverter formed by the directly connected gates of those MOSFETs. The source of p-channel MOSFET 25 is connected to positive supply terminal 13 and the source of p-channel MOSFET 26 is connected to the drain of MOSFET 23 which has its source connected to positive supply terminal 13. The drains of MOSFETs 25 and 26 are connected to the drain of n-channel MOSFET 27 which has its drain connected to ground terminal 14.

The parallel connection of p-channel MOSFETs 25 and 26 increases the current which must be sunk by n-channel MOSFET 27 when the logic state on terminal 11 is high so that, correspondingly, the inverter output low thereby raising the inverter input switching voltage value below which the signal on terminal 11 must fall to switch the inverter to the high output logic state which corresponds with CMOS switching values. Removing MOSFET 26 from the circuit by providing a low logic state on control terminal 15 will thus lower the inverter input switching voltage value below which the signal on terminal 11 must fall to switch the inverter to the high output logic state which corresponds with bipolar switching values. The input signal switching point shift controlled circuitry connected to resistor 20' having a corresponding p-channel MOSFETs, 25' and 26', and a corresponding n-channel MOSFET, 27', operates in the same manner.

The output signal from the inverter having p-channel MOSFETs 25 and 26 connected in parallel with one another and together in series with a n-channel MOSFET 27 is provided over an interconnection from the inverter output at the drains of these MOSFETs to an input of a conventional CMOS two input NAND gate, 28. This gate provides access control for the input signal at input signal terminal 11 insofar as its being transmitted to the subsequent differentiating approximation circuitry which approximately differentiates this input signal prior to applying the result to an input coil (not shown) to generate a magnetic field extending across an isolation barrier to a current sensor. The other input to this gate is connected to a monitor control terminal, 29, to which is also connected the output of a power monitor system, to be described below, which in normal operation has on its output a high logic state value. In this circumstance, the output of NAND gate 28 will follow in the logic state opposite to that applied to the gate input from the inverter having p-channel MOSFETs 25 and 26 and n-channel MOSFET 27.

A further conventional CMOS two input NAND gate, 28', has one of its inputs connected to the output of the inverter having p-channel MOSFETs 25' and 26' connected in parallel with one another and together in series with a n-channel MOSFET 27', that extends from input signal terminal 12, and its other input connected to the output of the power monitor at control terminal 29. NAND gate 28' operates in the same manner as NAND gate 28 in being provided ahead of further differentiating approximation circuitry operating a further input coil (this coil also not shown).

The differentiating approximation circuitry operated primarily by the output signals of NAND gate 28 has two signal path branches each having an input connected to the output of gate 28, i.e. the differentiating approximation circuitry signal path is split into two parallel paths. The first branch has a conductor and a parallel series string of logic gates connected to the output of NAND gate 28 and the second branch has the input of an initial inverter, 30, connected to the output of NAND gate 28 with the output of gate 30 connected to a conductor and a parallel series string of logic gates like those of the first branch. The first branch has the input of a conventional CMOS inverter, 31, connected to the output of NAND gate 28 and an output connected to an input of a conventional CMOS two input NOR gate, 32. The other input to this gate is connected to the output of a controlled oscillator to be described below which in normal operation has its output logic state at a logic low value. In this circumstance, the output of NOR gate 32 will follow in the logic state opposite to that applied to the gate input from inverter 31.

Three further conventional CMOS inverters, 33, 34 and 35, are connected in series with one another, input to output, with the input of inverter 33 connected to the output of NOR gate 32 and the output of inverter 35 connected to the input of a conventional CMOS two input NAND gate, 36. The other input of gate 36 is the conductor connected to the output of NAND gate 28 and the input of inverter 31. The output of NAND gate 36 is connected to the input of a further conventional CMOS inverter, 37, which is a high output current supplier for one side of an input coil (not shown as indicated above) connected to an output terminal, 38.

In this arrangement, the logic state value at the output of NAND gate 28, selected for this example as having arbitrarily been low for a while, results in the conductor input of NAND gate 36 being in a low logic state value and the inverter input of NAND gate 36 being in a high logic state value. This comes about because of the odd number (5) of logic signal value inverting logic gates between that inverter input of gate 36 and the output of NAND gate 28. As a result, the output of NAND gate 36 will be at a high logic state value in this circumstance.

A transition from this initial low logic state value to a high logic state value at the output of NAND gate 28 will be directly provided on the conductor input of NAND gate 36 leaving both of the inputs of NAND gate 36 at a high logic state value temporarily. This occurs since the resulting logic state transition does not reach the inverter input of NAND gate 36 immediately due to the switching delays through inverters 31, 33, 34 and 35, and through NOR gate 32. Thus, the logic state on the output of NAND gate 36 will switch to a low logic state value temporarily. Thereafter, following the switching delays, the inverter input of NAND gate 36 will go to a high logic state value again as the transition propagates through to the inverter input thereof so that a pulse at the low logic state value between high logic state values will have occurred at the output of NAND gate 36 at about the time of the low to high logic state value transition at the output of NAND gate 28. This pulse will have a duration approximately equal to the switching delays for this transition to propagate to the inverter input of NAND gate 36. The signal inversion through inverter 37 will result in a pulse at signal output 38 (input to one end of the input coil) at approximately the same time at the high logic state value between low logic state values with a duration approximately equal to the switching delays for the gate 28 transition to propagate to the inverter input of NAND gate 36.

In the opposite situation in which output of NAND gate 28 has been high for a while, the conductor input of NAND gate 36 will be in a high logic state value and the inverter input of NAND gate 36 will be in a low logic state value. As a result, the output of NAND gate 36 will again be at a high logic state value in this circumstance.

A transition from this initial high logic state value to a low logic state value at the output of NAND gate 28 will be directly provided on the conductor input of NAND gate 36 leaving both of the inputs of NAND gate 36 at a low logic state value temporarily. This occurs again since the resulting logic state transition does not reach the inverter input of NAND gate 36 immediately due to the switching delays through inverters 31, 33, 34 and 35, and through NOR gate 32. Thus, the logic state on the output of NAND gate 36 will remain at a high logic state value. Thereafter, following the switching delays, the inverter input of NAND gate 36 will go to a high logic state value again as the transition propagates through to the inverter input thereof again leaving the output of NAND gate 36 in a high logic state. Hence, in this high to low logic state value transition at the output of NAND gate 28, there will be no pulse formed at the output of NAND gate 36. Therefore, signal output 38 will simply remain at a low logic state value for this transition at the output of gate 28.

Since the logic gates of the second branch of the differentiating approximation circuitry after inverter 30 are like those of the first branch, they are designated the same as those in the first branch with following primes. Thus, the corresponding inverters are designated 31', 33', 34', 35' and 37' with the NOR gate being designated 32' and the NAND gate being designated 36', and with the signal output terminal (input to the other end of the input coil) being designated 38'. Because of inverter 30 at the beginning of the second branch being the only difference between that branch and the first branch, the results are just the opposite at signal output terminal 38' for the low to high and the high to low transitions at the output of NAND gate 28.

Therefore, a pulse at the high logic state value between low logic state values will occur at signal output 38' at about the time of high to low logic state value transition at the output of NAND gate 28 of a duration approximately equal to the switching delays. There will be no pulse formed at signal output 38 for a low to high logic state value transition at the output of NAND gate 28. Thus, logic state transitions in one direction at the output of NAND gate 28 lead to current pulses in one direction through the input coil, and logic state transitions in the other direction at the output of gate 28 lead to current pulses in the opposite direction through the input coil.

The differentiating approximation circuitry extending from signal input terminal 12 is identical to that extending from input signal terminal 11, and so that circuitry is designated in the same for corresponding components as those in the first branch but with following multiple prime marks. Thus, the corresponding inverters are designated 30', 31" and 31'", 33" and 33'", 34" and 34'", 35" and 35'", and, finally, 37" and 37'". The NOR gates are designated 32" and 32'", the NAND gates are designated 36" and 36'", and the signal output terminals (inputs to the other input coil) are designated 38" and 38'".

Connected to the second input of each of NOR gates 32, 32', 32" and 32'" is the output of a combined ring and relaxation controlled oscillator shown also in FIG. 1A that provides a low duty cycle oscillatory output signal when permitted to do so. This oscillator is formed of seven inverters connected in series with one another input to output. Five of the inverters, 40, 41, 42, 43 and 44, are conventional CMOS inverters and are shown in logic symbol form. The output of inverter 44 is the oscillator output and is connected the input of each of the NOR gates just set out. This inverter output is also connected to the input of a sixth inverter shown in circuit schematic form having the drains of a p-channel MOSFET, 45, and a n-channel MOSFET, 46, connected together to form the inverter output while the connected together gates of each form the input of this inverter connected, as stated, to the output of inverter 44. The source of MOSFET 45 is connected to positive voltage supply terminal 13, and the source of MOSFET 46 is connected to ground reference terminal 14. The width-to-length ratio of transistor 45 is much greater than that of transistor 46 to provide significantly greater current passing capabilities to transistor 45 than to transistor 46.

This last, inverter shown in schematic form, has its output connected to a capacitor, 47, having its other side connected to ground reference terminal 14. The inverter can thus charge capacitor 47 rapidly through large width-to-length ratio transistor 45 and discharge capacitor 47 relatively slowly through smaller width-to-length ratio transistor 46, but subject to an oscillator control n-channel MOSFET, 48, having its drain and source connected across capacitor 47, or between the output of this last inverter and ground reference terminal 14. The gate of control MOSFET 48 is brought to an input terminal, 49, to which signals from a power monitor are to be brought as will be described below. Thus, a normal operation high logic state signal value on terminal 49 will cause MOSFET 48 to be switched on to thereby shunt and discharge capacitor 47, while a low logic state signal value thereon will allow capacitor 47 to be charged and discharged by the immediately preceding inverter.

Finally, the seventh and final inverter, has its input formed by the joined together gates of a pair of p-channel MOSFETs, 50 and 51, and a pair of n-channel MOSFETs, 52 and 53, the output of this inverter being provided by the junction formed through the interconnection of the drains of MOSFETs 51 and 52. The drain of p-channel MOSFET 50 is connected to the source of p-channel MOSFET 51, and the source of MOSFET 50 is connected to positive voltage supply terminal 13. The drain of n-channel MOSFET 53 is connected to the source of n-channel MOSFET 51, and the source of MOSFET 53 is connected to ground reference terminal 14. A feedback p-channel MOSFET, 54, has its source connected to the junction of the drain of p-channel MOSFET 50 and the source of p-channel MOSFET 51, along with its gate being connected to the inverter output and its drain connected to ground reference terminal 14. A feedback n-channel MOSFET, 55, has its source connected to the junction of the drain of n-channel MOSFET 53 and the source of n-channel MOSFET 52, along with its gate being connected to the inverter output and its drain connected to positive supply voltage terminal 13.

This inverter-like input and feedback output arrangement provides a hysteretic inverter with low to high logic state transition at the input having a different switching threshold value than a high to low logic state transition. Such a characteristic results from the feedback transistors and the outer transistors connected to the inverter input shifting the source voltage of the inner transistors connected to the inverter input during such switching transitions. This hysteresis in the input switching threshold values provides a stable discharge voltage range for capacitor 47 for subsequent relatively slow dischargings following rapid chargings of that capacitor by the preceding inverter, based on MOSFETs 45 and 46, causing the voltage across this capacitor to exceed the upper switching threshold value of the hysteretic inverter. The times of charging and the subsequent switching time delays around the ring of inverters in the oscillator primarily determines the pulse width in each oscillation, and the time of discharging of capacitor 47 primarily determines the period of oscillation of this oscillator which is large relative to the switching delays around the ring of inverters.

If the input to NAND gates 28 and 28' connected to control terminal 29, which terminal is also connected the output of the power monitor system mentioned above, has the normal operation high logic state value thereon switched by the power monitor to a low logic state value as a result of sensing a sufficient voltage supply positive voltage value decrease, the output of these gates will be switched to high logic state value. This logic state value will be retained on the output of these gates, despite changes in logic state values on input signal terminals 11 and 12, until the voltage supply positive voltage value is sensed to have increased enough to allow normal operation to resume.

In these circumstances, NAND gate 36 (36") will always have a high logic state value applied to its input connected by a conductor to the output of gate 28 (28'), and NOR gate 32 (32") will always have a low logic state value applied to its input connected through inverter 31 (31") to the output of gate 28 (28'). On the other hand, NAND gate 36' (36''') will always have a low logic state value applied to its input connected by a conductor to the output of gate 28 (28') through inverter 30 (30'), and NOR gate 32' (32''') will always have a high logic state value applied to its input connected through inverters 30 and 31' (30' and 31''') to the output of gate 28 (28'). If at the same time that the logic state value switches from high to low on control input terminal 29 the logic state value on control input terminal 49 is also switched by the power monitor from its normal high value to a low value as a result of sensing insufficient supply voltage, the oscillator in FIG. 1A will begin to oscillate and provide logic states on the inputs of NOR gates 32, 32', 32" and 32''' that oscillate between high and low values.

As a result, the logic states on the outputs of NOR gate 32 (32") and NAND gate 36 (36") will oscillate between high and low values in synchronism with the oscillator as will the logic states on output terminal 38 (38") after conversion to the opposite phase through inverter 37 (37"). In contrast, the logic states on the outputs of NOR gate 32' (32''') and NAND gate 36' (36''') will remain in low and high logic states, respectively. Thus, current pulses will repeatedly forced through the two input coils but in only one direction to cause the current sensor on the other side of the isolation barrier to always be forced to a single state until the power monitor senses that the power supply voltage value has recovered sufficiently to continue normal operation which it institutes by having the logic states on control terminals 29 and 49 return to the high logic state value.

The power monitor system is shown in FIG. 1B. A control input, 60, is provided for altering operation of the power monitor to be compatible with a either a 5.0 V or a 3.0 V positive voltage value being provided on voltage supply positive voltage terminal 13. A logic state high value provided on terminal 60, or leaving it as a open circuit, selects a circuit configuration for operating at a 5.0 V value on terminal 13, and a logic state low value selects for operating at a 3.0 V value on terminal 13.

The electrostatic discharge protection circuitry at terminal 60 is like that at terminal 15 and operates in the same fashion, and therefore, the component numerical designations are the same but with an added prime mark to make three such marks. Thus, a p-channel MOSFET, 16''', is connected at one of its channel terminating regions to control input terminal 60 with its other terminating region connected to voltage supply terminal 13 as is its gate through a transient current limiting resistor, 17'''. A n-channel MOSFET, 18''', is connected at one of its channel terminating regions to control input terminal 60 with its other terminating region connected to ground terminal 14 as is its gate through a transient current limiting resistor, 19'''. Finally, a current limiting resistor, 20''', is connected between control input terminal 60 and subsequent buffer and voltage supply positive voltage value monitoring circuitry.

Two conventional CMOS inverters, 22' and 22", as buffer inverters are provided with the input of inverter 22" connected to output of inverter 22', and with a diode-connected p-channel MOSFET, 21", being connected between voltage supply positive terminal 13 and the junction of resistor 20''' and the input of inverter 22. The use of two inverters leaves the logic signal at the output of inverter 22" the same as that appearing on control terminal 60.

The output of inverter 22" is connected to the gate of a n-channel MOSFET, 61, used to control the nominal voltage output of a voltage divider intended to provide an output of nominally 1.5 V no matter whether the voltage on provided on positive voltage supply terminal 13 is 5.0 V or 3.0 V. However, the actual voltage output of the voltage divider is made dependent on the specific value of positive voltage appearing between voltage supply positive voltage terminal 13 and ground reference terminal 14 to thereby serve as a monitor of that voltage value. The drain of MOSFET 61 is connected to a resistor which is connected to the junction of a pair of resistors, 63 and 64, serving as the voltage divider. The other end of resistor 63 is connected to positive voltage supply terminal 13, and the other end of resistor 64 is connected to ground reference terminal 14.

Resistors 63 and 64 are of equal resistance value so 3.0 V on terminal 13 will be divided equally leaving nominally 1.5 V at the junction of these two resistors as desired. Thus, MOSFET 61 is chosen to be switched off by a logic state low value at terminal 60 for situations in which 3.0 V is provided on terminal 13. A slightly smaller value of resistance is chosen for resistor 62 so that when it is connected in parallel with resistor 64 their combined value forms a voltage divider with resistor 63 to provide nominally 1.5 V at the junction of resistors 63 and 64 in situations in which 5.0 V is provided on terminal 13. Hence, MOSFET 61 is chosen to be switched on by a logic state high value at terminal 60 for situations in which 5.0 V is provided on terminal 13. A comparison differential amplifier is used to compare the voltage at the junction of resistors 63 and 64 as a representation of the voltage on voltage supply positive voltage terminal 13 with a reference voltage provided that is independent of the voltage on terminal 13. The result of this comparison determines whether the voltage on that terminal has dropped so low for whatever reason that normal operation of the two separate signal transmission information channels of FIG. 1A should be interrupted at least temporarily.

The reference voltage developed for this comparison, independently of the voltage on terminal 13, is provided through a band-gap voltage reference generator. A pair of diode connected pnp bipolar transistors, 65 and 66, have their bases and collectors connected to ground reference terminal 14. A p-channel MOSFET, 67, having its source connected to voltage supply positive voltage terminal 13, supplies current to transistors 65 and 66 from its drain under control of a differential input feedback loop. This drain current is provided in part to transistor 65 through a resistor, 68, connected between that drain and the emitter of transistor 65, and in part to transistor 66 through a pair of resistors, 69 and 70, connected in series between that drain and the emitter of transistor 66.

Transistor 66 is formed with a greater emitter area than transistor 65 thereby resulting in a smaller base-emitter voltage in transistor 66 than in transistor 65 for the same current therethrough which is the situation by making the resistance value of resistor 68 equal to that of resistor 69. This difference in base-emitter voltages for transistors 65 and 66 appears across resistor 70, and is maintained by the feedback loop since the differential input of the feedback loop is connected on one side to the emitter of transistor 65 and, on the other side, to the junction of resistors 69 and 70. The loop forces p-channel MOSFET 67 to provide enough current at its drain to make the base-emitter voltage of transistor 65 just equal the lower base-emitter voltage of transistor 66 plus the needed additional voltage drop across resistor 70. Thus, a suitable reference voltage, based on maintaining this difference in base-emitter voltages of bipolar transistors 65 and 66, appears at the drain of p-channel MOSFET 67, the value chosen to be 1.25 V.

The pair of input interconnections for the differential input of the feedback loop provided by a feedback differential amplifier has one member connected to the junction of resistor 68 and the emitter of transistor 65 at one end as indicated above, and has the other end connected to the gate of a p-channel MOSFET, 71, as a differential amplifier input transistor. The remaining member of this pair is connected one end to the junction of resistors 69 and 70 also as indicated above, and has the other end connected to the gate of a p-channel MOSFET, 72, as the other differential amplifier input transistor. MOSFET 71 has its drain connected to the gate and drain of a n-channel MOSFET, 73, serving as a diode connected load transistor. Similarly, MOSFET 72 has its drain connected to the gate and drain of a n-channel MOSFET, 74, also serving as a diode connected load transistor.

The gate of load transistor 73 is also connected to the gate of a further n-channel MOSFET, 75, as an output buffer with the sources of each connected to ground reference terminal 14. Similarly, the gate of load transistor 74 is also connected to the gate of a further n-channel MOSFET, 76, as an output buffer with the sources of each connected to ground reference terminal 14. Transistor 75 has its drain connected to the drain and gate of a diode connected, p-channel MOSFET, 77, as a load having its source connected to voltage supply positive voltage terminal 13. Similarly, transistor 76 has its drain connected to the drain of a diode connected, p-channel MOSFET, 78, as a load having its source connected to voltage supply positive voltage terminal 13. The gate of transistor 78 is connected to the gate of transistor 77 to be a mirrored load.

MOSFETs 71 and 72, as input transistors, have their sources connected together and to the drain and gate of a further p-channel MOSFET, 79, having its source connected to voltage supply positive voltage terminal 13. Diode connected MOSFET 79 serves as a current source for the feedback differential amplifier.

The output of the feedback differential amplifier is taken as a single ended output rather than a differential output at the junction of the drains of MOSFETs 76 and 78. This output is connected to the gate of p-channel MOSFET 67 serving as the current controller supplying current to bipolar transistors 65 and 66 through resistors 68, 69 and 70 as described above to complete the feedback loop. The feedback differential amplifier together with transistor 67 form an operational transconductance amplifier. The gate of a further n-channel MOSFET, 80, is connected to the feedback differential amplifier output with both its source and drain being connected to ground reference terminal 14 to thereby form a capacitor used to reduce the loop bandwidth for increasing loop stability. Since the reference voltage at the drain of transistor 67 is to be very stable, the output voltage of the feedback differential amplifier can be expected to also be very stable and is therefore used to bias the gates of other transistors in the system as will be described below.

Because the feedback loop could alternatively provide a stable output of zero, an operation initiation circuit is provided connected to the reference voltage output at the drain of p-channel MOSFET 67. This circuit has four successive inverters of varying width-to-length ratios each connected output to input to reach sufficient output voltage and current values at the output of the last inverter. The number of inverters required is proportional to the natural log of the load capacitance at the output and inversely proportional to the minimum width-to-length ratio available. Each of these inverters is formed of a p-channel MOSFET and a n-channel MOSFET as a pair. These pairs are designated 81 and 82 for the first inverter, 83 and 84 for the second, 85 and 86 for the third, and 87 and 88 for the fourth and final inverter. The gates of each of these transistor pairs are connected together to form the inverter input and the drains of each pair are connected together to form the inverter output. Each of the p-channel MOSFETs in these pairs has its source connected to voltage supply positive voltage terminal 13, and n-channel MOSFETs in these pairs has its source connected to ground reference terminal 14.

The input of the first inverter formed by the connected gates of transistors 81 and 82 is connected to the drain of p-channel MOSFET 67, and the output of the fourth inverter formed by the connected drains of transistors 87 and 88 is connected to the gate of a p-channel MOSFET, 89, serving as a current controller. Transistor 89 has its source connected to voltage supply positive voltage terminal 13 and its drain connected also to the drain of p-channel MOSFET 67. If the voltage at the drain of transistor 67 is zero, transistor 89 will be forced into the on condition to provide current to resistors 68, 69 and 70, and to bipolar transistors 65 and 66, to thereby start operation of the feedback loop in a higher reference voltage mode. Once the output voltage at the drain of transistor 67 rises sufficiently, transistor 89 will be switched off.

The reference voltage at the drain of p-channel MOSFET 67 is provided to one side of a comparison differential amplifier through an interconnection therefrom to the gate of a n-channel MOSFET, 90, as a differential amplifier input transistor. The voltage at the junction of resistors 63 and 64 as a representation of the voltage on voltage supply positive voltage terminal 13 is provided to the other side of this comparison differential amplifier through an interconnection therefrom to the gate of a p-channel MOSFET, 91, as a differential amplifier input transistor. MOSFET has its drain connected to the gate and drain of a p-channel MOSFET, 91, to serve as a diode connected load transistor. MOSFET 91 has its drain connected to the gate and drain of a n-channel MOSFET, 93, to also serve as a diode connected load transistor.

The gate of load transistor 92 is also connected to the gate of a further p-channel MOSFET, 94, as a cross-coupled load transistor with the sources of each connected to voltage supply positive voltage terminal 13. Similarly, the gate of load transistor 93 is also connected to the gate of a further p-channel MOSFET, 95, as a cross-coupled load transistor with the sources of each connected to voltage supply positive voltage terminal 13. Transistor 94 has its drain connected to the drain of MOSFET 91. Similarly, transistor 95 has its drain connected to the drain of MOSFET 90. Through changing the load currents through input transistors 90 and 91, these cross-coupled load transistors provide a gain increase for the differential amplifier based on the ratio of their width to length ratio to the width to length ratio of the load transistor with which its gate is commonly connected.

MOSFETs 90 and 91, as input transistors, have their sources connected together and to the drain of a further n-channel MOSFET, 96, having its source connected to ground reference terminal 13. A further diode connected n-channel MOSFET, 97, has its gate and drain connected to the gate of transistor 96 and its source connected to ground reference terminal 14. The drain of transistor 97 is connected to the drain of a p-channel MOSFET, 98, as a mirroring current source load, having its source connected to voltage supply positive voltage terminal 13 and its gate connected to the junction of the feedback differential amplifier output and the gate of p-channel MOSFET 67 as source of a stable bias voltage as indicated above. Thus, a stable current is provided through the current source provided by transistor 98 so connected which is mirrored in transistor 96. MOSFET 96 thus serves as a stable current sink for the comparison differential amplifier.

The differential output from the drains of transistors 90 and 91 is taken at the gates of two p-channel MOSFETs, 99 and 100, connected to these drains as output buffers, each of transistors 99 and 100 having its source connected to voltage supply positive voltage terminal 13. These buffer transistors each has its drain connected to the drain of a corresponding one of a pair of n-channel MOSFETs, 101 and 102, serving as loads with each having its source connected to ground reference terminal 14. The gate of transistor 101 is connected to its drain to form a diode connected transistor and to the gate of transistor 102 to form mirrored loads. The output of the comparison differential amplifier is then taken at the junction of the drains of transistors 100 and 102 as a single ended output. If the voltage supply positive voltage value representation exceeds the reference voltage, the comparison differential amplifier output signal will be at a relatively low voltage value and, if it does not exceed the reference voltage, this output signal will be at a relatively high voltage value.

This output signal from the comparison differential amplifier output is supplied to the input of a conventional CMOS inverter, 103, connected thereto serving as a buffer. The output of inverter 103 is connected to the input of a further and similar inverter, 104, to negate the phase change of the signal introduced by inverter 103. The output of inverter 104 is connected to the joined gates of a p-channel MOSFET, 105, and a n-channel MOSFET, 106, as the input of an inverter they together form, these MOSFETs having their drains connected to one another to provide the inverter output. The current that this inverter can source or sink is set by the provision of a current source at the source of transistor 105 provided by a further p-channel MOSFET, 107, and the provision of a current sink at the source of transistor 106 provided by another n-channel MOSFET, 108.

Thus, the drain of transistor 107 is connected to the source of transistor 105 and its source is connected to voltage supply positive voltage terminal 13. The gate of transistor 107 is connected to the output of the feedback differential amplifier and the gate of transistor 67 as a source of a stable voltage to set the gate to source voltage of that transistor. Similarly, the drain of transistor 108 is connected to the source of transistor 106 and its source is connected to ground reference terminal 14. The gate of transistor 107 is connected to the gate of transistor 97 which has its gate to source voltage set by the current supplied thereto by transistor 98 determined by the connection of its gate also to the output of the feedback differential amplifier.

This setting of the currents that the inverter formed of transistors 105 and 106 can source or sink gives reliable charging and discharging times for a capacitor, 109, connected between the inverter output at the junction of the drains of these transistors and ground reference terminal 14, in reaching the switching threshold values of the following hysteretic inverter having its input also connected to capacitor 109. This hysteretic inverter has corresponding transistors and operates in the same manner as the one previously described in FIG. 1A. Thus, the transistors here in the hysteretic inverter of FIG. 1B are designated with the same numerical designators as were used with the corresponding transistors of the hysteretic inverter of FIG. 1A but with single prime marks added thereafter, that is, transistors 50', 51', 52', 53', 54' and 55'.

The output logic signal from this hysteretic inverter output is supplied to the input of a conventional CMOS inverter, 110, connected thereto serving as a buffer. The output of inverter 110 is connected to terminal 49 to control starting and stopping oscillations of the oscillator in FIG. 1A, and to the input of a further and similar inverter, 111, to negate the phase change of the signal introduced by inverter 110. The output of inverter 111 is connected to the joined gates of a p-channel MOSFET, 112, and a n-channel MOSFET, 113, as the input of an inverter they together form, these MOSFETs having their drains connected to one another to provide the inverter output. The source of transistor 112 is connected to voltage supply positive voltage terminal 13, and the source of transistor 113 is connected to ground reference terminal 14. In addition, the output of inverter 111 is connected to an input of a conventional CMOS two input NAND gate, 114.

Hence, if the voltage supply positive voltage value representation does not exceed the reference voltage (as will occur upon the initial energization of the circuit), the comparison differential amplifier output signal will be at a relatively high voltage value leading to the discharging of capacitor 109 and a logic state low value at the output of inverter 110 and terminal 49 so that the oscillator of FIG. 1A will be permitted to oscillate. The output of inverter 111 will have a logic state high value which is applied to the input of NAND gate 114, and to the input of the inverter based on transistors 112 and 113 so that its output is at a logic state low value. A voltage supply positive voltage value representation that exceeds the reference voltage leads to the comparison differential amplifier output signal being at a relatively low voltage value leading to the charging of capacitor 109 and a logic state high value at the output of inverter 110 and terminal 49 so that the oscillator of FIG. 1A will not be permitted to oscillate. The output of inverter 111 will have a logic state low value which is applied to the input of NAND gate 114, and to the input of the inverter based on transistors 112 and 113 so that its output is at a logic state high value.

A further circuit portion operates directly with the voltage provided on voltage supply positive voltage terminal 13 and so is primarily effective at the initial energization of the circuit and following significant voltage drops at that terminal. A p-channel MOSFET, 115, has its gate also connected to the stable source of voltage provided in normal operation at the output of the feedback differential amplifier and the gate of transistor 67. The source of transistor 115 is connected to terminal 13, and the drain of that transistor is connected to a capacitor, 116, having its other side connected to ground reference terminal 14 so that it is charged and discharged through this transistor.

A series of three conventional CMOS inverters, 117, 118 and 119, are connected output to input with the input of inverter 117 serving as a buffer being connected to the junction of drain of transistor 115 and capacitor 116. The output of inverter 119 is connected to an input of a conventional CMOS two input NOR gate, 120. The output of NOR gate 120 is connected to the remaining input of NAND gate 114 which has terminal 29 at its output.

The remaining components in FIG. 1B comprise a power monitor system latch formed by transmission gates provided with NOR gate 120 to be used in the control of the oscillator of FIG. 1A. The latch signal input is provided from the output of inverter 119 connected to one input of NOR gate 120, as described above, with the remaining input of that gate supplied either from its output through a conventional CMOS inverter, 121, and further through a transmission gate, 122, or from ground reference terminal 14 through another transmission gate, 123. That is, the input of converter 121 is connected to the output of NOR gate 120, and the output of that inverter is connected to one side of transmission gate 122. The other side of that transmission gate is connected to the input of NOR gate 120 which is also connected to one side of transmission gate 123 having its remaining side connected to ground reference terminal 14.

These two transmission gates are controlled so that when one transmits the other blocks by a conventional CMOS two input NAND gate, 124, having one input connected to the output of inverter 110 and terminal 49. The output of a further conventional CMOS inverter, 125, is connected to the remaining input of NAND gate 124 and has its input connected to the output of the inverter formed by transistors 112 and 113 at the junction of their drains. Thus, inverter 111, the inverter formed of transistors 112 and 113, and inverter 125 provided a logic signal to the input of NAND gate 124 connected to the output of inverter 125 that is a delayed and inverted version of the logic signal provided to the other input of gate 124 by inverter 110. The output of NAND gate 124 is connected to the direct control terminal of transmission gate 123 and the negated control terminal of transmission gate 122 as well as to the input of a further conventional CMOS inverter, 126. The output of inverter 126 is connected to the direct control terminal of transmission gate 122 and the negated control terminal of transmission gate 123.

The initial energization of the system at the beginning of operation leads to the charging of capacitors 109 and 116 which, prior to such energization, will be discharged so that they represent a logic state low value at such a start of operation. As a result, this beginning value on capacitor 116 provides an initial logic state high value on the input of NOR gate 120 connected to the output of inverter 119.

The beginning effective logic state low value on capacitor 109 results in a logic state low value at the output of inverter 110, and so on terminal 49 to switch n-channel MOSFET 48 in FIG. 1A into the off condition to thereby permit the oscillator of that figure to begin oscillating, and in a logic state low value on the input of NAND gate 124 connected thereto in FIG. 1B. Further, this also results in a logic state high value at the output of inverter 111, and so on the input of NAND gate 114 connected thereto, and in a logic state high value at the output of inverter 125, and so on the remaining input of NAND gate 124 connected thereto after both inputs to this gate were at a low value. The initial and resulting logic states low value at the output of NAND gate 124, and the resulting logic state low value at the output of inverter 126, switches on transmission gate 122 and switches off transmission gate 123 to thereby stably provide a logic state low value at the output of NOR gate 120 by its being latched at that value through the resulting logic state high value at the output of inverter 121 being applied through transmission gate 122 to the input of NOR gate 120 connected thereto.

This latched logic state low value at the output of NOR gate 120 is provided to the input of NAND gate 114 connected thereto so that a logic state high value is provided on the output thereof. As a result, NAND gates 28 and 28' of FIG. 1A permit the transmission therethrough of the input signals on input signal terminals 11 and 12 to the subsequent differentiating approximation circuitry so that pulses are applied to the input coils because of the oscillations of the oscillator in that figure in accord with these input signals. That is, one logic state value for the input signal leads to oscillator pulses once per oscillation period (unless the input signal is in state transition which could result in an additional or a longer pulse) on one end of an input coil and the opposite input signal logic state value leads to oscillator pulses oscillator pulses once per oscillation period on the other end of that input coil.

Capacitor 116, in FIG. 1B, charging through p-channel MOSFET 115, will reach a voltage thereacross that is effectively a logic state high value first because of its smaller value and greater charging leading to the logic state at the input of NOR gate 120 connected to inverter 119 changing from a low value to a high value. However, the logic state value at the output of this gate remains at a logic state low value so that the latched value in that gate does not change.

Thereafter, the voltage supply positive voltage value representation comes to exceed the reference voltage developed at the output of the feedback differential amplifier in FIG. 1B so that the output of the comparison differential amplifier in FIG. 1B goes to a logic state low value to force the output of the inverter based on transistors 105 and 106 toward a logic state high value to charge capacitor 109. As a result, that capacitor will reach a voltage thereacross that is effectively a logic state high value. Hence, the output of inverter 110 will switch from a logic state low value to a high value as will terminal 49 thereby switching on transistor 48 of FIG. 1A to terminate the output signal oscillatory behavior of the oscillator of that figure. This output value of inverter 110 will also switch the input of NAND gate 124 connected to that output to have a logic state high value thereon. The output of inverter 111 will be switched to a logic state low value to switch the input of NAND gate 114 connected thereto to a logic state low value also. However, the output of inverter 125 will be switched to a logic state a logic state low value to place the other input of NAND gate 124 at that same low value but only after both inputs are momentarily at a logic state high value due to the switching delays through inverter 111, the inverter formed of transistors 112 and 113, and inverter 125.

The output of NAND gate 124 in these circumstances will momentarily go to a logic state low value to switch open transmission gate 122 and switch closed transmission gate 123 so that logic state low value (ground reference terminal 14) is placed on the input of NOR gate 120 connected to the transmission gates to provide a logic state high value at the output of NOR gate 120. This will stably provide a logic state high value at the output of NOR gate 120 by its being latched at that value through the resulting logic state low value at the output of inverter 121 being applied through transmission gate 122 to the input of NOR gate 120 connected thereto as the input of NAND gate 124 connected to inverter 125 goes to a logic state high value, following its low value during the short time both of the inputs of that gate were at a logic state high, to thereby close transmission gate 122 and open transmission gate 123.

The logic state high value at the output of NOR gate 120 will be provided to the input of NAND gate 114 connected thereto. Thus, the output of gate 114, or terminal 29, will remain at a logic state high which leaves the inputs of NAND gates 28 and 28' of FIG. 1A unchanged so that input signals on signal inputs 11 and 12 are still passed through to the subsequent differentiating approximation circuitry though without being supplemented or affected by the now switched off oscillator of that figure.

If during operation, a serious power supply positive voltage dip or interruption occurs on voltage supply positive voltage terminal 13 so that the power supply representation voltage at the junction of resistors 63 and 64 drops below the reference voltage at the output of the feedback differential, the output voltage of the comparison differential amplifier shifts to a logic state high value. This results in the inverter formed of transistors 105 and 106 beginning to discharge capacitor 109. On the other hand, such a disruption at the source of transistor 115 has little effect on the voltage across capacitor 116 since this capacitor has no discharge path leading therefrom so that it continues to effectively present a logic state high value.

Should the discharge of capacitor 109 continue sufficiently long to reduce the voltage across capacitor 109 to below the switching point of the hysteretic inverter to which it is connected, the logic state signal value at the output thereof will shift to a high value. This will cause the output of inverter 110 to go to a logic state low value to switch n-channel MOSFET 48 in FIG. 1A into the off condition to thereby permit the oscillator of that figure to begin oscillating, and in a logic state low value on the input of NAND gate 124 connected thereto in FIG. 1B. Further, this also results in a logic state high value at the output of inverter 111, and so on the input of NAND gate 114 connected thereto, and in a logic state high value at the output of inverter 125, and so on the remaining input of NAND gate 124 connected thereto momentarily after its other input was forced to a logic state low value. A logic state high value results at the output of NAND gate 124 to keep closed transmission gate 122 and keep open transmission gate 123.

The logic state value high on the input of NAND gate 114 from the output of inverter 111 and the logic state value high on the other input of NAND gate 114 from the output of NOR gate 120 switches the output of NAND gate 114, or terminal 29, to a logic state low value which is provided on the inputs of NAND gates 28 and 28' in FIG. 1A. This prevents the outputs of these latter two gates from following the input signals on input signal terminals 11 and 12. Instead, a logic state high value is provided at the outputs of these two gates so that one direction current pulses are forced by the oscillator into the input coils as described above.

If the positive voltage on voltage supply positive voltage terminal 13 returns to more normal values, the output of the comparison differential amplifier will return to a logic state low value and capacitor 109 will again be charged to and beyond an effective logic state high value. The results of this as described above following initial energization will repeat, and normal operation with pulses to the input coils following the input signals will resume.

The arrangement of FIGS. 1A and 1B uses a latch as a memory element as the basis to have the oscillator operate in different circumstances and not operate in others to reduce electrical power consumption. An alternative is to have the oscillator operate continuously but with a very small duty cycle so that again relatively little power is consumed. An alternative arrangement for a portion of the arrangement of FIGS. 1A and 1B is shown in FIG. 2 in mixed logic and circuit schematic form for achieving this alternative mode of operation.

Figure 2:
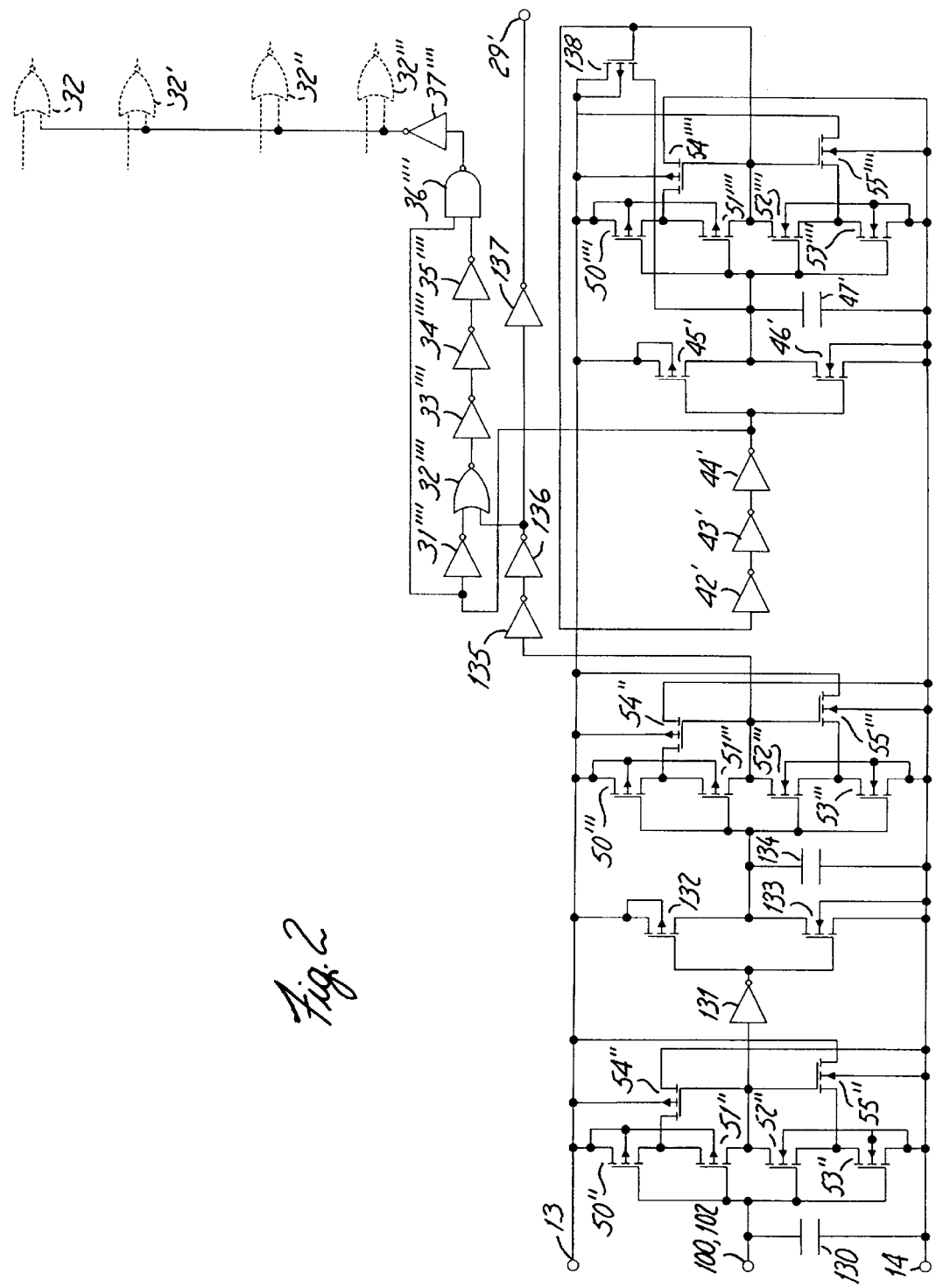
FIG. 2 shows a mixed circuit and logic schematic diagram of a signal isolator input arrangement embodying an alternative to a portion of the arrangement shown schematically in FIG. 1.

The arrangement components shown in solid lines in FIG. 2 replaces the oscillator of FIG. 1A and the circuitry and logic to the right of the output of the comparison differential amplifier in FIG. 1B formed by the junction of the drains of transistors 100 and 102. Thus, the input node at the left of FIG. 2 is designated 100,102 which is connected to this comparison differential amplifier output. The same or similar designations are used for circuit and logic components and terminals in FIG. 2 as were used for corresponding components and terminals in FIGS. 1A and 1B.

Hence, the comparison differential amplifier charges and discharges a switching delay capacitor, 130, connected between its output and ground reference terminal 14, above and below, respectively, the switching thresholds of a further hysteretic inverter similar to the one in the oscillator of FIG. 1A. This hysteretic inverter has its input formed of the connected gates of transistors 50", 51", 52" and 53" which is connected to terminal 100,102 and capacitor 130, and generally has similar circuit components therein designated by the same numbers used in the hysteretic inverter of FIG. 1A followed by double prime marks. The output of this hysteretic inverter at the junction of drains 54" and 55" is connected to the input of a conventional CMOS inverter, 131, which has its output connected to the input of a further inverter formed of the joined gates of p-channel MOSFET, 132, and of a n-channel MOSFET, 133, which has an output formed by the junction of the drains of these transistors. The source of transistor 132 is connected to voltage supply positive voltage terminal 13 and the source of transistor 133 is connected to ground reference terminal 14.

The inverter output formed by the joined drains of transistors 132 and 133 has a further switching delay capacitor, 134, connected between it and ground reference terminal 14 so that this inverter can charge and discharge this capacitor above and below, respectively, the switching thresholds of yet a further hysteretic inverter again similar to the one in the oscillator of FIG. 1A. This last hysteretic inverter has its input formed of the connected gates of transistors 50''', 51''', 52''' and 53''' which is connected to capacitor 134, and generally has similar circuit components therein designated by the same numbers used in the hysteretic inverter of FIG. 1A followed by triple prime marks. The output of this hysteretic inverter at the junction of drains 54" and 55" is connected to the input of a conventional CMOS inverter, 135, which has its output connected to the input of a further conventional CMOS inverter, 136.

Inverter 136 has its output connected to a pulse slimming circuit to be described below and to the input of yet another conventional CMOS inverter, 137. The output of inverter 137 is connected to a terminal, 29', which is connected to terminal 29 of FIG. 1A to operate the inputs of NAND gates 28 and 28' of that figure.

A further input to the pulse slimming circuit is provided by the replacement oscillator shown in FIG. 2 for the oscillator shown in FIG. 1A. Though the oscillator in FIG. 1A was connected to the differentiating approximation circuitry directly, in the arrangement of FIG. 2 the pulse slimming circuitry is instead connected to that differentiating approximation circuitry with the replacement oscillator connected to it.

This replacement oscillator is essentially like the oscillator of FIG. 1A but with the control transistor omitted to leave the oscillator free-running and with two inverters omitted to thereby shorten the time duration of the pulse provided by the oscillator in each oscillation period. The numerical designations used for the components of the oscillator of FIG. 1A are used again in the oscillator of FIG. 2 with the addition of a prime mark thereafter except for the components of the hysteretic inverter therein which instead have four prime marks added after the numeral for each component. Thus, the inverter formed of transistors 45' and 46' charges and discharges capacitor 47' connected between its output and ground reference terminal 14, above and below, respectively, the switching thresholds of the hysteretic inverter. This hysteretic inverter has its input formed of the connected gates of transistors 5"", 51"", 52"" and 53"" which is connected to capacitor 47', and generally has similar circuit components therein designated by the same numbers used in the hysteretic inverter of FIG. 1A but followed by quadruple prime marks.

A feedback p-channel MOSFET, 138, has its source connected to voltage supply positive voltage terminal 13, its gate connected to the output of this hysteretic inverter at the junction of drains 54"" and 55"", and its source connected to capacitor 47' at the input of the hysteretic inverter. This transistor acts to rapidly complete the charging of capacitor 47' after the voltage thereon has exceeded the upper switching threshold value of the following hysteretic inverter.

The output of the hysteretic inverter is connected to the input of inverter 42' which has its output connected to the input of inverter 43'. The output of inverter 43' is connected to the input of inverter 44' which has its output connected to the joined gates of transistors 45' and 46' providing the input to that inverter formed by those two transistors. This oscillator, as indicated above, oscillates continuously to provide a continual oscillatory signal at its output at the output of inverter 44' connected to the pulse slimming circuit.

This pulse slimming circuit is formed like a signal path branch of one of the differentiating approximation circuits connected between an input signal terminal and the corresponding input coil in FIG. 1A. That is, this circuit has a conductor and a parallel series string of logic gates (inverter 31"", NOR gate 32"", inverter 33"", inverter 34"" and inverter 35"") connected to the output of the replacement oscillator at one end and each connected to one input of a two input NAND gate 36"" at the other end. NAND gate 36"" has its output connected to the input of inverter 37"". The output of inverter 37"" is connected to the input of each of NOR gates 32, 32', 32" and 32'" of FIG. 1A (shown in dashed line form in FIG. 2) in the alternative arrangement of FIG. 2 to which the oscillator in FIG. 1A was connected.

The initial energization of the system at the beginning of operation starts the replacement oscillator oscillating and leads to the charging of capacitors 130 and 134 which, prior to such energization, will be discharged so that they represent a logic state low value at such a start of operation. As a result, this beginning value on capacitor 134 provides an initial logic state high value on the input of NOR gate 32"" connected to the output of inverter 136. There is correspondingly a logic state low value at the output of inverter 137 connected to terminal 29' so that a logic state high value is forced at the outputs of NAND logic gates 28 and 28' in FIG. 1A preventing those outputs from following the input signals on input terminals 11 and 12.

The logic state high value on the input of NOR gate 32"" forces the output of that gate to be at a logic state low value and places a logic state high value at the output of inverter 35"" and on the input of NAND gate 36"". Thus, the pulses in the oscillation periods of the oscillator output signal at the input of inverter 31"" are transmitted for their full duration by the conductor connected to this input to the other input of NAND gate 36"" so that the output signal at that gate and the output signal of subsequent inverter 37"" also oscillate providing an oscillatory signal to the inputs of NOR gates 32, 32', 32" and 32'" of FIG. 1A. As in the explanation for the system of FIG. 1A given above, input current pulses in one direction through the input coils result during this start up situation.

Again, the voltage supply positive voltage value representation comes to exceed the reference voltage developed at the output of the feedback differential amplifier in FIG. 1B so that the output of the comparison differential amplifier in FIG. 1B goes to a logic state low value. This forces the voltage on capacitor 134 to increase to reach a voltage thereacross that is effectively a logic state high value after charging by the preceding inverter. This provides a logic state low value on the input of NOR gate 32"" connected to the output of inverter 136. There is correspondingly a logic state high value at the output of inverter 137 connected to terminal 29' so that a logic state low value is forced at the outputs of NAND logic gates 28 and 28' in FIG. 1A to allow those outputs to follow the input signals on input terminals 11 and 12.

The logic state low value on the input of NOR gate 32"" allows that gate to follow the logic signals provided thereto by inverter 31"". Thus, the pulses in the oscillation periods of the oscillator output signal at the input of inverter 31"" appear to the pulse slimming circuit as signal pulses appear to the differentiating approximation circuit following NAND gate 28 in FIG. 1A and are treated as described there to result in shorter duration pulses being transmitted to the inputs of NOR gates 32, 32', 32" and 32'" of FIG. 1A. This results in such shorter pulses being applied at the oscillation frequency of the replacement oscillator to the input coils in directions controlled by the logic state values in the input signals on input signal terminals 11 and 12 of that figure plus the pulses due to the edges of these input signals (or their lengthening of the oscillator based shortened pulses on occasion when they sufficiently close to coinciding). In this regard, as indicated above, a logic state high value at the output of NAND gate 28 leads to pulses in one direction through the input coil connected between output terminals 38 and 38', that is, from terminal 38 to 38'. A logic state low value at the output of NAND gate 28 leads to pulses in the opposite direction through the input coil from terminal 38' to 38.

If during operation, a serious power supply positive voltage dip or interruption occurs on voltage supply positive voltage terminal 13 so that the power supply representation voltage at the junction of resistors 63 and 64 drops below the reference voltage at the output of the feedback differential amplifier, the output voltage of the comparison differential amplifier shifts to a logic state high value. This results in the inverter formed of transistors 132 and 133 beginning to discharge capacitor 134. Should the discharge of capacitor 134 continue sufficiently long to reduce the voltage across that capacitor to below the switching point of the hysteretic inverter to which it is connected, the logic state signal value at the output thereof will shift to a high value. This will cause the same results as occur during the initial energization of the system as described above.

As indicated above, spurious edge triggerings of the isolator can be caused by ground transients, electromagnetic interference or unexpected transients through the power supply and the like. In low data rate input signals or low rate of change between logic states in the input signal, where the time between desired logic state transitions, or in completing a transition, becomes relatively long, there is increasing time input signal edges that increases the risk of such unwanted occurrences. An arrangement to operate the differentiating approximation circuitry used above to provide pulses to the input coils can be used to reduce the risk of errors in such arrangements, and is shown in the mixed circuit and logic schematic diagram of FIG. 3. This arrangement can alternatively be combined with the arrangements of FIG. 1 or FIG. 2 to provided both capabilities in one system.

Just a single input signal terminal is shown here, terminal 11, although two could again have been shown. Again, input 11 has electrostatic discharge circuitry protection provided immediately following it. The electrostatic discharge protection circuitry at terminal 11 here is like that at terminals 11, 12 and 15 in FIG. 1A and terminal 60 in FIG. 1B, and operates in the same fashion, and therefore, the component numerical designations are the same as at terminal 60 but with an added prime mark to make four such marks. Hence, a p-channel MOSFET, 16"", is connected at one of its channel terminating regions to control input terminal 11 of FIG. 3 with its other terminating region connected to voltage supply terminal 13 as is its gate through a transient current limiting resistor, 17"". A n-channel MOSFET, 18"", is connected at one of its channel terminating regions to control input terminal 11 with its other terminating region connected to ground terminal 14 as is its gate through a transient current limiting resistor, 19"". A current limiting resistor, 20"", is connected between control input terminal 11 and subsequent buffer and signal line noise limiter formed by a hysteretic inverter. Finally, a diode connected n-channel MOSFET, 140, having its gate and drain connected to resistor 20"" and its source connected to ground reference terminal 14, is provided to keep the input to the following hysteretic inverter near ground reference value in the absence of an input signal on terminal 11.

The hysteretic inverter having its input connected to resistor 20"" and transistor 140 has corresponding transistors and operates in the same manner as the one previously described in FIG. 1A. Thus, the transistors here in the hysteretic inverter of FIG. 3 are designated with the same numerical designators as were used with the corresponding transistors of the hysteretic inverter of FIG. 1A but with the superscript "v" added thereafter, that is, transistors $50^v$, $51^v$, $52^v$, $53^v$, $54^v$ and $55^v$.

Figure 3:
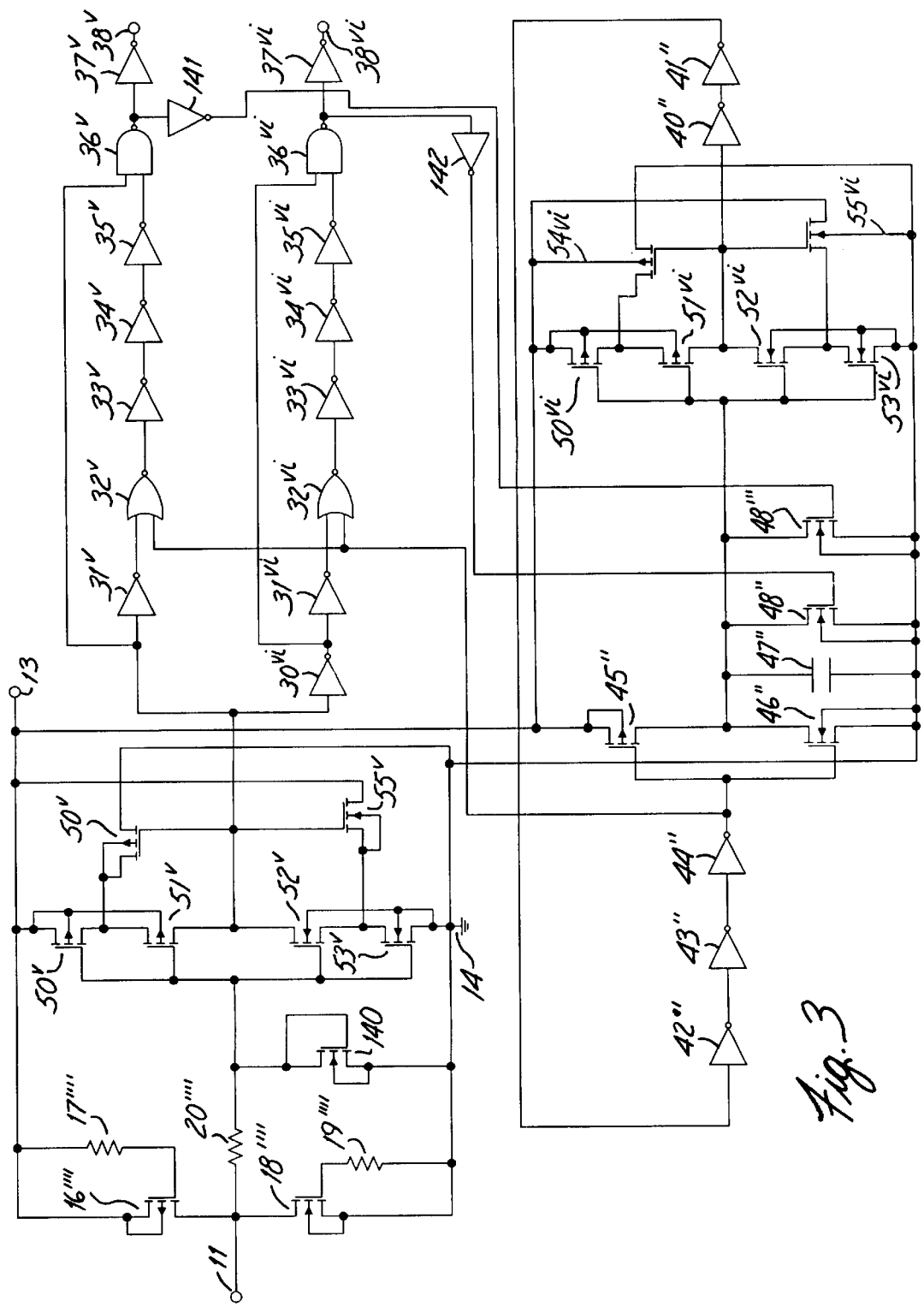
FIG. 3 shows a mixed circuit and logic schematic diagram of a further signal isolator input arrangement embodying another alternative to a portion of the arrangement shown schematically in FIG. 1.

The differentiating approximation circuit connected between one input signal terminal and the corresponding input coil in FIG. 1A is shown again in FIG. 3 connected between the output of the hysteretic inverter and such an input coil (again not shown) in FIG. 3. That is, this circuit has one signal path branch circuit with a conductor and a parallel series string of logic gates (inverter $31^v$, NOR gate $32^v$, inverter $33^v$, inverter $34^v$ and inverter $35^v$) connected to the output of the hysteretic inverter at one end and each connected to one input of a two input NAND gate $36^v$ at the other end. NAND gate $36^v$ has its output connected to the input of inverter $37^v$. The output of inverter 37"" is connected to signal output terminal $38^v$. This circuit also has another signal path branch circuit with a conductor and a parallel series string of logic gates (inverter $31^{vi}$, NOR gate $32^{vi}$, inverter $33^{vi}$, inverter $34^{vi}$ and inverter $35^{vi}$) connected to the output of the hysteretic inverter at one end and each connected to one input of a two input NAND gate $36^{vi}$ at the other end. NAND gate $36^{vi}$ has its output connected to the input of inverter $37^{vi}$. The output of inverter $37^{vi}$ is connected to signal output terminal $38^{vi}$.

The oscillator of FIG. 1A is repeated in FIG. 3 but with another control transistor added. The numerical designations used for the components of the oscillator of FIG. 1A are used again in the oscillator of FIG. 3 with the addition of a double prime mark thereafter except for the components of the hysteretic inverter therein which instead have a superscript "vi" added after the numeral for each component. Thus, the inverter formed of transistors 45" and 46" charges and discharges capacitor 47" connected between its output and ground reference terminal 14, above and below, respectively, the switching thresholds of the hysteretic inverter. This hysteretic inverter has its input formed of the connected gates of transistors $50^{vi}$, $51^{vi}$, $52^{vi}$ and $53^{vi}$ which is connected to capacitor 47", and generally has similar circuit components therein designated by the same numbers used in the hysteretic inverter of FIG. 1A followed by quadruple prime marks.

The output of the hysteretic inverter at the junction of drains $54^{vi}$ and $55^{vi}$ is connected to the input of inverter 40" which is the first in a succession of inverters connected input to output including inverters 41", 42" and 43'. The output of inverter 43' is connected to the input of inverter 44' which has its output connected to the joined gates of transistors 45' and 46' providing the input to that inverter formed by those two transistors. This last inverter can charge capacitor 47" rapidly through large width-to-length ratio transistor 45" and discharge capacitor 47" relatively slowly through smaller width-to-length ratio transistor 46", but subject to two oscillator control n-channel MOSFETs, 48" and 48''', each having its drain and source connected across capacitor 47", or between the output of this last inverter and ground reference terminal 14.

Switching n-channel MOSFETs 48" and 48''' between the on and off conditions is controlled at or near the outputs of the signal path branch circuits in the differentiating approximation circuit connected between the output of the hysteretic inverter in FIG. 3 and the input coil not shown. That is, the input of a conventional CMOS inverter, 141, is connected to the output of NAND gate $36^v$ and its output is connected to the gate of transistor 48'''. Similarly, the input of a conventional CMOS inverter, 142, is connected to the output of NAND gate $36^{vi}$ and its output is connected to the gate of transistor 48".

During normal operation with input signals exhibiting sufficient logic level transition rates, transitions between logic state values at the outputs of NAND gates $36^v$ and $36^{vi}$ occur sufficiently often to be inverted and transmitted through inverters 141 and 142 to switch transistors 48" and 48''' into the on condition frequently. This leads to shunting discharging of capacitor 47" often enough to keep that capacitor sufficiently discharged to prevent the oscillator of FIG. 3 from oscillating. However, a sufficiently lengthy duration between transitions between logic state values at the outputs of NAND gates $36^v$ and $36^{vi}$ due to an interruption of the input signal, or too low a logic level transition rate therein, will allow capacitor 47" to be charged sufficiently by the inverter formed of transistors 45" and 46" to cause this oscillator to begin providing an oscillatory output signal at its output, i.e. at the output of inverter 44".

Such a result leads to the oscillator output signal being applied to oscillate on the inputs of NOR gates $32^v$ and $32^{vi}$. Thus, the pulses in the oscillation periods of the oscillator output signal are applied at the oscillation frequency of the oscillator to the input coils in directions controlled by the logic state values in the input signals on input signal terminal 11. In this regard, as indicated above in connection with FIG. 1A, a logic state high value at the output of the hysteretic inverter leads to pulses in one direction through the input coil connected between signal output terminals $38^v$ and $38^{vi}$, that is, from terminal $38^v$ to $38^{vi}$. A logic state low value at the output of the hysteretic inverter leads to pulses in the opposite direction through the input coil from terminal $38^{vi}$ to $38^v$.

As a result, the oscillator will be caused to stop oscillating by the ensuing logic state value transitions at the outputs of NAND gates $36^v$ and $36^{vi}$ leading to the discharge of capacitor 47" by transistors 48" and 48''' through the feedback loop to the output of the oscillator. If the input signal at input terminal 11 resumes, or is provided with logic state value transitions of a sufficient rate, normal operation of the differentiating approximation circuit resumes as directed by the input signals on input terminal 11. Otherwise, the oscillator again starts.

Figure 4:
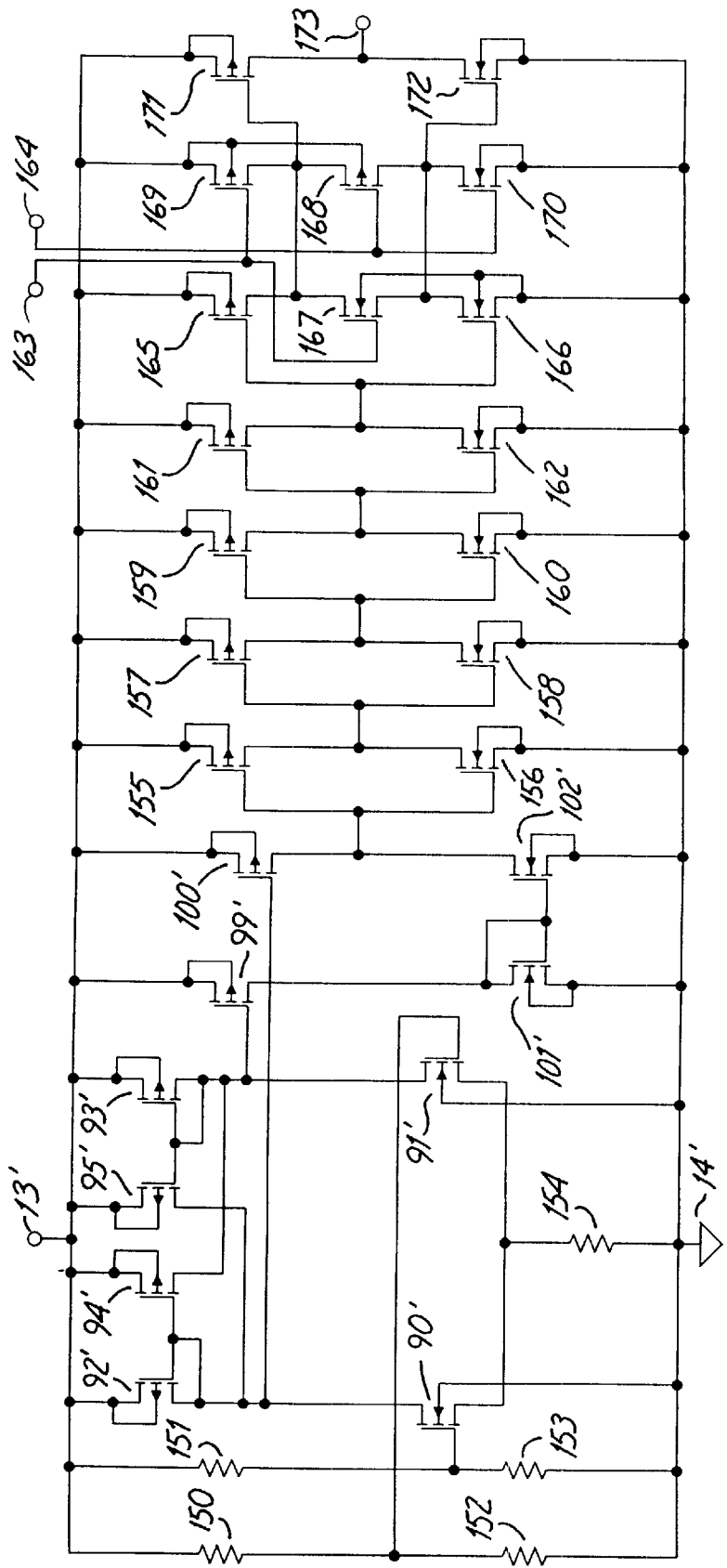
FIG. 4 shows a schematic diagram of a circuit embodying an extension to the arrangements shown schematically in FIGS. 1, 2 and 3.

The signal isolator input arrangements described above each provide current pulses in one direction or the other to an input coil positioned adjacent a signal isolator output arrangement perhaps supported on the same substrate, often termed a receiver circuit, which is shown in circuit schematic form in FIG. 4. Such an input coil is positioned on an electrically insulating isolating layer, often a polymer material layer, directly across from a bridge circuit formed by magnetoresistive effect based resistors 150, 151, 152 and 153 on the other side of that layer. The electrical insulation capability of that layer to provide electrical isolation between the signal isolator input and output arrangements is typically sufficient to withstand at least 2,500 V ac rms for a period of 1 minute.

This bridge circuit and the rest of the signal isolator output arrangement, also to sustain electrical isolation, are operated between a pair of voltage supply terminals, 13' and 14', which are entirely separated in a circuit sense from positive voltage supply terminal 13 and ground reference terminal 14 between which the signal isolator input arrangement operates. These voltage supply terminals 13' and 14' are suited to have a voltage supply with a positive voltage output of typically either 3.0 or 5.0 Volts value electrically connected to terminal 13' and a voltage ground reference electrically connected to terminal 14'.

Magnetoresistors 150 and 152 are connected in series between voltage supply terminals 13' and 14' as are magnetoresistors 151 and 153. The junction of magnetoresistors 150 and 152 in the series combination thereof, and the junction of magnetoresistors 151 and 153 in the series combination thereof, provide the differential outputs for the bridge output signal.

When current pulses are provided to such an input coil from the signal isolator input arrangement due to input logic signals being provided to a signal input terminal, such as terminal 11 in the preceding figures, corresponding magnetic fields result directed primarily along the plane of the substrate supporting the signal isolator output arrangement that are proportional to the magnitudes of these current pulses and to the number of turns in the input coil. These magnetic fields cause the resistors 150, 151, 152 and 153 to change in resistance values so that the presence thereof is effectively sensed. These resistors are typically "giant magnetoresistive effect" magnetoresistors offering a relatively large resistance change for a given change in a magnetic field in which they are immersed. Protection from unwanted external magnetic fields is afforded by a highly permeable material shield, such as permalloy, deposited directly over both the input coil and sensing magnetoresistors. A certain degree of concentration of such magnetic fields is also created by this shield so that it also serves as a flux concentrator.

The structural configuration used for magnetoresistors 150, 151, 152 and 153 exhibiting the "giant magnetoresistive effect" is a spin valve configuration having the following characteristics. An externally applied magnetic field resulting from an input coil current pulse of some minimum magnitude X in some direction Y incident on such a magnetoresistor causes that resistor to change resistance value (if it is not initially set to the resistance corresponding to that field value and direction), and maintain that new resistance value, after an exposure of approximately 2 ns to that field even though it is subsequently removed. That is, such subsequent removal of the external field (or even re-exposure to a similar field) has no effect on the resistor. At a later time, another externally applied magnetic field incident on that resistor of around the same magnitude X but oppositely directed (i.e. directed in the −Y direction as a result of an input coil current pulse of the opposite polarity) causes the resistor to reset its resistance value back to the original value. Again, this later resistance value is maintained after approximately 2 ns as, again, the subsequent removal (or even again re-exposure to a similar field) has no effect on the resistor.

The use of a bridge configuration for operating these magnetoresistors provides a change in the bridge output signal voltage of approximately 5% for such a change in the direction of externally applied magnetic fields while keeping a similar magnitude that are incident on the four magnetoresistors. In the case of a 5 V positive voltage being used on positive supply voltage terminal 13', that results in a useful bridge output signal voltage of approximately 125 mV in response to an input coil current pulse of a polarity opposite that of the preceding current pulse.

The outputs of the magnetoresistor bridge circuit are connected to the inputs of a differential amplifier serving as a comparator formed much as the comparison differential amplifier of FIG. 1B to operate in the same manner, but with a resistor, 154, provided in place of transistor 96 in FIG. 1B along with omitting transistors 97 and 98 for biasing transistor 96. Thus, with this exception, corresponding components in FIG. 4 are designated in FIG. 4 by the same numerical designations used for the components of the comparison differential amplifier in FIG. 1B followed by a prime mark.

The output of the comparator is then taken at the junction of the drains of transistors 100' and 102' as a single ended output rather than a differential output. A current pulse to an input coil from the signal isolator input arrangement in one direction will leave the magnetoresistor bridge outputs unbalanced in one direction to place the output of the comparator at one logic state value. A current pulse to an input coil from the signal isolator input arrangement in the other direction will leave the magnetoresistor bridge outputs unbalanced in the opposite direction to place the output of the comparator at the opposite logic state value.

The comparator output is connected to the input of a series of four successive inverters with varying width-to-length ratios each connected output to input to provide sufficient output voltage and current values at the output of the last inverter. These inverters are needed because of the selected output stage size and capacitive load. The number of inverters required is proportional to the natural log of the load capacitance at the output and inversely proportional to the minimum width-to-length ratio available.

Each of these inverters is formed of a p-channel MOSFET and a n-channel MOSFET as a pair. These pairs are designated 155 and 156 for the first inverter, 157 and 158 for the second, 159 and 160 for the third, and 161 and 162 for the fourth and final inverter. The gates of each of these transistor pairs are connected together to form the inverter input and the drains of each pair are connected together to form the inverter output. Each of the p-channel MOSFETs in these pairs has its source connected to voltage supply positive voltage terminal 13', and n-channel MOSFETs in these pairs has its source connected to ground reference terminal 14'.

The output of the last inverter at the drains of transistors 161 and 162 is connected to the input of the output stage which can be switched under the direction of two complementary enable signals provided to two complementary enable control terminals, 163 and 164, from operating as a succession of two inverters to operating in a high impedance mode that leaves the output terminal connected to two transistors that are each in the off condition. A p-channel MOSFET, 165, has its source connected to voltage supply positive voltage terminal 13' and a n-channel MOSFET, 166, has its source connected to ground reference terminal 14', with the gates of these two transistors forming the input of the output stage each connected to the joined drains of transistors 161 and 162 forming the last inverter output. A further n-channel MOSFET, 167, has its drain connected to the drain of transistor 165 and its source connected to the drain of transistor 166, and further has its gate connected to enable control terminal 163.

In a similar arrangement, another p-channel MOSFET, 168, has its source connected to the drain of a p-channel MOSFET, 169, and its drain connected to the drain of a n-channel MOSFET, 170, and in turn has its gate connected to complementary enable control terminal 164. Transistor 169 has its source connected to voltage supply positive voltage terminal 13' with its gate connected to enable control terminal 163, and transistor 170 has its source connected to ground reference terminal 14' with its gate connected to complementary enable control terminal 164.

The junction of the drains of transistors 165 and 167, and the junction of the drain of transistor 169 and the source of transistor 168, are each connected to the gate of a p-channel MOSFET, 171, having its source connected to voltage supply positive voltage terminal 13'. The junction of the drain of transistor 166 and the source of transistor 167, and the junction of the drains of transistors 168 and 170, are each connected to the gate of a n-channel MOSFET, 172, having its source connected to ground reference terminal 14'. The drains of transistors 171 and 172 are connected together to form the output, 173, of the output stage.

If enable control terminal 163 is at a high logic state value and complementary enable control terminal 164 is at a low logic state value, the output stage will operate as a succession of two inverters connected output to input. The first inverter is formed of transistors 165 and 166 since transistor 167 will be in the on condition continuously. The second inverter is formed of transistors 171 and 172 since transistor 168 will be in the on condition continuously with transistors 169 and 170 being in the off condition continuously. Reversing the logic state values at terminals 163 and 164 will switch transistors 167 and 168 into the off condition and transistors 169 and 170 into the on condition to thereby switch each of transistors 171 and 172 into the off condition leaving the signal paths from output terminal 173 with high impedances.

Although the present invention has been described with reference to preferred embodiments, workers skilled in the art will recognize that changes may be made in form and detail without departing from the spirit and scope of the invention.

What is claimed is:

1. A transformable signal transmission system for providing electrical energization to a load electrically connected to an output thereof based on input signals provided at an input thereof except during occurrences of a selected condition initiating an transmission transformation during which an alternative energization is provided to said load, said system comprising:

a condition determiner having a control output, said condition determiner capable of determining occurrences or absences of said selected condition and further capable of providing a first condition signal on said control output thereof upon absences of said selected condition, and of providing a second condition signal on said control output thereof upon occurrences of said selected condition;

an oscillator having an output and being capable of providing an oscillatory signal on said output thereof; and a pulser having an output serving as said transmission system output, a signal input serving as said transmission system input, and a receiver input electrically connected to said oscillator output, said condition determiner control output being coupled to at least a selected one of said oscillator and said pulser, said pulser capable of providing electrical energization pulses at said output thereof based on said input signals supplied to said signal input thereof when said first condition signal is provided on said condition determiner control output, and of providing an alternative electrical energization at said output thereof based on signals supplied to said receiver input thereof when said second condition signal is provided on said condition determiner control output.

2. The transmission system of claim 1 wherein said pulser also has a condition input which is electrically connected to said condition determiner control output.

3. The system of claim 2 wherein said condition determiner control output is a first control output and said condition determiner has a second control output, said condition determiner being capable of providing said first condition signal on said first control output thereof and providing an enable signal on said second control output thereof upon absences of said selected condition, and of providing said second condition signal on said first control output thereof and providing a status directive signal on said second control output thereof upon occurrences of said selected condition; and wherein said oscillator is a controlled oscillator having an input electrically connected to said condition determiner second control output, said controlled oscillator being capable of providing an oscillatory signal on said output thereof upon said enable signal being supplied to said input thereof and of providing a status selection signal on said output thereof upon said status directive signal being supplied to said input thereof.

4. The system of claim 3 wherein said pulser having a first split path pulse branch having a first branch split input electrically connected to a branch input that is electrically connected to said pulser signal input and having a branch end signal combiner with a pair of inputs and with an output electrically connected to said pulser output, said branch end signal combiner being capable of providing an output signal in one signal state at said output thereof for signals in one kind of common signal state at each of said pair of inputs thereof and further capable of providing said output signal in an alternative signal state at said output thereof for signals in a different kind of common signal state at each of said pair of inputs thereof or in different signal states at each of said pair of inputs thereof, said pair of inputs of said branch end signal combiner each being electrically connected to said first branch split input by a corresponding one of a pair signal interconnections each providing a time delay to signals passing therethrough such that durations of each said time delay differ from one another, one of said pair of signal interconnections having an intermediate signal combiner therein with said intermediate signal combiner having an output electrically connected to that branch end signal combiner input corresponding thereto through any subsequent intervening portion of that signal interconnection and with said intermediate signal combiner having a pair of inputs with one of this pair of inputs being electrically connected to said first branch split input through any preceding intervening portion of that signal interconnection and with that remaining one of these inputs being said receiver input, said intermediate signal combiner being capable of providing an output signal in one signal state at said output thereof for signals in one kind of common signal state at each of said pair of inputs thereof and further capable of providing said output signal in an alternative signal state at said output thereof for signals in a different kind of common signal state at each of said pair of inputs thereof or in different signal states at each of said pair of inputs thereof.

5. The system of claim 2 wherein said pulser having a first split path pulse branch having a first branch split input electrically connected to a branch input that is electrically connected to said pulser signal input and having a branch end signal combiner with a pair of inputs and with an output electrically connected to said pulser output, said branch end signal combiner being capable of providing an output signal in one signal state at said output thereof for signals in one kind of common signal state at each of said pair of inputs thereof and further capable of providing said output signal in an alternative signal state at said output thereof for signals in a different kind of common signal state at each of said pair of inputs thereof or in different signal states at each of said pair of inputs thereof, said pair of inputs of said branch end signal combiner each being electrically connected to said first branch split input by a corresponding one of a pair signal interconnections each providing a time delay to signals passing therethrough such that durations of each said time delay differ from one another, one of said pair of signal interconnections having an intermediate signal combiner therein with said intermediate signal combiner having an output electrically connected to that branch end signal combiner input corresponding thereto through any subsequent intervening portion of that signal interconnection and with said intermediate signal combiner having a pair of inputs with one of this pair of inputs being electrically connected to said first branch split input through any preceding intervening portion of that signal interconnection and with that remaining one of these inputs being said receiver input, said intermediate signal combiner being capable of providing an output signal in one signal state at said output thereof for signals in one kind of common signal state at each of said pair of inputs thereof and further capable of providing said output signal in an alternative signal state at said output thereof for signals in a different kind of common signal state at each of said pair of inputs thereof or in different signal states at each of said pair of inputs thereof.

6. The transmission system of claim 1 wherein said pulser is capable of providing electrical energization pulses at said output thereof based on said input signals supplied to said signal input thereof without varying signals being supplied to said receiver input thereof, and of providing an alternative electrical energization at said output thereof based at least in part on varying signals being supplied to said receiver input thereof; and wherein said oscillator is a controlled oscillator having an input electrically connected to said condition determiner control output, said controlled oscillator being capable of providing an oscillatory signal on said output thereof upon said first condition signal being provided on said condition determiner control output and of providing a status selection signal on said output thereof upon said second condition signal being provided on said condition determiner control output.

7. The system of claim 6 wherein said pulser having a first split path pulse branch having a first branch split input electrically connected to a branch input that is electrically connected to said pulser signal input and having a branch end signal combiner with a pair of inputs and with an output electrically connected to said pulser output, said branch end signal combiner being capable of providing an output signal in one signal state at said output thereof for signals in one kind of common signal state at each of said pair of inputs thereof and further capable of providing said output signal in an alternative signal state at said output thereof for signals in a different kind of common signal state at each of said pair of inputs thereof or in different signal states at each of said pair of inputs thereof, said pair of inputs of said branch end signal combiner each being electrically connected to said first branch split input by a corresponding one of a pair signal interconnections each providing a time delay to signals passing therethrough such that durations of each said time delay differ from one another, one of said pair of signal interconnections having an intermediate signal combiner therein with said intermediate signal combiner having an output electrically connected to that branch end signal combiner input corresponding thereto through any subsequent intervening portion of that signal interconnection and with said intermediate signal combiner having a pair of inputs with one of this pair of inputs being electrically connected to said first branch split input through any preceding intervening portion of that signal interconnection and with that remaining one of these inputs being said receiver input, said intermediate signal combiner being capable of providing an output signal in one signal state at said output thereof for signals in one kind of common signal state at each of said pair of inputs thereof and further capable of providing said output signal in an alternative signal state at said output thereof for signals in a different kind of common signal state at each of said pair of inputs thereof or in different signal states at each of said pair of inputs thereof.

8. The system of claim 1 further comprising a coil connected to said transmission system output positioned across an electrical insulating layer from a magnetic field sensor.

9. The system of claim 8 wherein said magnetic field sensor is a magnetoresistive effect based sensor.

10. The system of claim 9 wherein said magnetic field sensor is a giant magnetoresistive effect based sensor.

11. The system of claim 10 wherein said magnetic field sensor is a spin valve magnetoresistor.

12. The system of claim 1 wherein said pulser has a first split path pulse branch having a first branch split input electrically connected to a branch input that is electrically connected to said pulser signal input and having a first branch output electrically connected to said pulser output, said first branch split input and output having a pair of signal interconnections electrically connected therebetween each providing a time delay to signals passing therethrough such that durations of each said time delay differ from one another with corresponding such signals from said pair signal interconnections being combined at said first branch output to provide a first branch output signal thereat based on said difference between said durations, one of said pair signal interconnections being electrically connected to said pulser receiver input between said first branch split input and output and being capable of receiving a supplemental signal at said receiving input such that said supplemental signal can selectively change signal states of signals propagating between said first branch split input and output initiated from said first branch split input.

13. The system of claim 1 wherein said selected condition is magnitudes of operating voltage supplied to said signal transmission system being less than a selected monitoring value.

14. The system of claim 13 wherein said selected condition is sensed by comparing said magnitudes of operating voltage supplied to said signal transmission system with a voltage reference having a value substantially independent of said magnitudes of operating voltage supplied to said signal transmission system.

15. The system of claim 1 wherein said selected condition is durations of times between occurrences of pulses at said pulser output exceeding a selected monitoring value.

16. The system of claim 15 wherein said selected condition is sensed by using said durations of times between occurrences of pulses at said pulser output to control charging of a capacitor.

* * * * *